(12) United States Patent
Hino et al.

(10) Patent No.: US 11,040,453 B2
(45) Date of Patent: Jun. 22, 2021

(54) ROBOT SYSTEM

(71) Applicant: Seiko Epson Corporation, Tokyo (JP)

(72) Inventors: Makiko Hino, Matsumoto (JP);
Yasushi Mizoguchi, Suwa (JP);
Shuichi Wakabayashi, Okaya (JP)

(73) Assignee: Seiko Epson Corporation

( * ) Notice: Subject to any disclaimer, the term of this patent is extended or adjusted under 35 U.S.C. 154(b) by 426 days.

(21) Appl. No.: 16/142,325

(22) Filed: Sep. 26, 2018

(65) Prior Publication Data

US 2019/0091870 A1 Mar. 28, 2019

(30) Foreign Application Priority Data

Sep. 28, 2017 (JP) .............................. JP2017-187414

(51) Int. Cl.
| | |
|---|---|
| *B25J 9/16* | (2006.01) |
| *G06K 9/00* | (2006.01) |
| *B25J 19/02* | (2006.01) |
| *G06K 9/20* | (2006.01) |
| *B25J 5/00* | (2006.01) |
| *B25J 9/00* | (2006.01) |
| *G06T 7/521* | (2017.01) |

(52) U.S. Cl.
CPC ............ *B25J 9/1697* (2013.01); *B25J 5/007* (2013.01); *B25J 9/0087* (2013.01); *B25J 9/1666* (2013.01); *B25J 9/1687* (2013.01); *B25J 19/022* (2013.01); *B25J 19/023* (2013.01); *G06K 9/00664* (2013.01); *G06K 9/2036* (2013.01); *G06T 7/521* (2017.01)

(58) Field of Classification Search
USPC ................................................. 700/245–264
See application file for complete search history.

(56) References Cited

U.S. PATENT DOCUMENTS

| | | | | |
|---|---|---|---|---|
| 6,374,155 | B1 * | 4/2002 | Wallach | G05D 1/0274 |
| | | | | 700/245 |
| 6,614,427 | B1 * | 9/2003 | Aubrey | H04N 13/275 |
| | | | | 345/419 |

(Continued)

FOREIGN PATENT DOCUMENTS

| | | |
|---|---|---|
| JP | 2010-188459 A | 9/2010 |
| WO | WO-2006-043396 A1 | 4/2006 |

*Primary Examiner* — Jonathan L Sample
(74) *Attorney, Agent, or Firm* — Harness, Dickey & Pierce, P.L.C.

(57) ABSTRACT

A robot system includes an automatic transport device, a robot arm that is installed on the automatic transport device, an object recognition sensor that is disposed on the robot arm, an environment recognition sensor, a placement portion that is disposed on the automatic transport device, and a controller, and in which the controller controls the automatic transport device for moving toward a work stand based on a recognition result of the environment recognition sensor and controls the robot arm for transferring a plurality of component kits from the placement portion to the work stand based on a recognition result of the object recognition sensor after controlling the robot arm for taking out the components from a component storage unit based on the recognition result of the object recognition sensor and creating the plurality of component kits on the placement portion.

7 Claims, 16 Drawing Sheets

(56) References Cited

U.S. PATENT DOCUMENTS

| Patent/Pub. No. | Date | Inventor | Classification |
|---|---|---|---|
| 7,099,745 B2* | 8/2006 | Ebert | G05D 1/0088 700/245 |
| 7,269,479 B2* | 9/2007 | Okamoto | B25J 5/007 318/568.12 |
| 8,374,721 B2* | 2/2013 | Halloran | G05D 1/0242 700/245 |
| 9,427,874 B1* | 8/2016 | Rublee | B25J 11/0075 |
| 9,457,970 B1* | 10/2016 | Zevenbergen | B65G 15/22 |
| 9,527,211 B2* | 12/2016 | Posselius | G05B 19/402 |
| 9,625,571 B1* | 4/2017 | Yamazaki | B25J 9/1697 |
| 10,065,314 B2* | 9/2018 | Tian | B25J 19/023 |
| 2003/0212472 A1* | 11/2003 | McKee | G05D 1/0274 700/245 |
| 2004/0073337 A1* | 4/2004 | McKee | G05D 1/0251 700/245 |
| 2006/0015215 A1* | 1/2006 | Howard | G05D 1/0088 700/245 |
| 2006/0095160 A1* | 5/2006 | Orita | G05D 1/027 700/248 |
| 2006/0111811 A1* | 5/2006 | Okamoto | B25J 9/0003 700/214 |
| 2006/0213167 A1* | 9/2006 | Koselka | A01B 79/005 56/10.2 A |
| 2007/0061041 A1* | 3/2007 | Zweig | G05D 1/0261 700/245 |
| 2007/0156286 A1* | 7/2007 | Yamauchi | G05D 1/0251 700/245 |
| 2007/0192910 A1* | 8/2007 | Vu | B25J 19/06 700/245 |
| 2008/0086236 A1* | 4/2008 | Saito | G06N 3/008 700/245 |
| 2008/0147239 A1* | 6/2008 | Chiang | B25J 13/084 700/264 |
| 2008/0161970 A1* | 7/2008 | Adachi | B25J 9/1676 700/253 |
| 2009/0125145 A1 | 5/2009 | Adachi et al. | |
| 2009/0132088 A1* | 5/2009 | Taitler | B25J 13/02 700/264 |
| 2009/0234499 A1* | 9/2009 | Nielsen | B25J 9/1666 700/250 |
| 2011/0054689 A1* | 3/2011 | Nielsen | G05D 1/0088 700/258 |
| 2011/0202175 A1* | 8/2011 | Romanov | B25J 5/00 700/250 |
| 2011/0202224 A1* | 8/2011 | Thompson | G05D 1/0295 701/26 |
| 2012/0152877 A1* | 6/2012 | Tadayon | F24S 25/10 212/224 |
| 2013/0343640 A1* | 12/2013 | Buehler | B25J 9/1697 382/155 |
| 2014/0336818 A1* | 11/2014 | Posselius | G05D 1/0297 700/248 |
| 2014/0350725 A1* | 11/2014 | LaFary | G05B 19/4061 700/253 |
| 2014/0365258 A1* | 12/2014 | Vestal | G06Q 10/063114 705/7.15 |
| 2015/0360865 A1* | 12/2015 | Massey | B25J 9/0003 414/275 |
| 2017/0357270 A1* | 12/2017 | Russell | G05D 1/0242 |
| 2018/0029797 A1* | 2/2018 | Hance | B65G 1/0492 |
| 2018/0079079 A1* | 3/2018 | Gombert | B25J 9/1676 |
| 2018/0307246 A1* | 10/2018 | Hodge | G05D 1/0282 |

* cited by examiner

ROBOT SYSTEM

BACKGROUND

1. Technical Field

The present invention relates to a robot system.

2. Related Art

There is known a robot system that creates a component kit composed of a plurality of components using a robot including a robot arm (see, for example, JP-A-2010-188459). For example, in the robot system described in JP-A-2010-188459, the robot takes out the plurality of components necessary for producing a product from a component storage unit in which the plurality of components are stored one by one and forms a component kit on a support stand away from the component storage unit.

However, since the robot system described in JP-A-2010-188459 creates a component kit on a support stand away from the component storage unit, there is a problem that the number of times that the robot reciprocates between the component storage unit and the support stand increases depending on the number of component kits to be created and the number of components configuring the component kit and work efficiency is poor.

SUMMARY

An advantage of some aspects of the invention is to provide a robot system capable of efficiently creating a component kit.

The invention can be implemented as the following application examples or forms.

A robot system according to an application example includes an automatic transport device that is capable of being automatically moved, a robot arm that is installed on the automatic transport device and performs work on a target, an object recognition sensor that is disposed on the robot arm and recognizes the target, an environment recognition sensor that recognizes an environment in a direction in which the automatic transport device moves, a placement portion that is disposed on the automatic transport device and on which a plurality of component kits are allowed to be placed, and a controller that controls the automatic transport device so as to move toward a work stand based on a recognition result of the environment recognition sensor and controls the robot arm so as to transfer the plurality of component kits from the placement portion to the work stand based on a recognition result of the object recognition sensor, after controlling the robot arm so as to take out a plurality of components from a component storage unit that stores the components and create the plurality of the component kits on the placement portion based on the recognition result of the object recognition sensor.

According to such a robot system, since the automatic transport device is moved toward the work stand and a plurality of component kits are placed from the placement portion to the work stand to be transferred after a plurality of components are respectively taken out from the component storage unit and the plurality of component kits are created on the placement portion, it is possible to reduce the number of times that the automatic transport device reciprocates between the component storage unit and the work stand as compared with a case where the plurality of components are respectively taken out from the component storage unit and a plurality of component kits are directly created on the work stand. For that reason, it is possible to efficiently create a component kit.

In the robot system according to the application example, it is preferable that the object recognition sensor includes a projection unit that projects stripe-shaped pattern light to the target, an image capturing device that captures a image of the pattern light on the target, and a calculation unit (processor) that calculates a shape of the target based on an imaging result of the image capturing device and the projection device includes a light source unit that emits a line-shaped laser and an optical scanner that reflects the laser from the light source unit toward the target to scan the target.

With this configuration, a small object recognition sensor can be realized.

In the robot system according to the application example, it is preferable that the projection device includes a scanner drive unit that outputs a drive signal for non-resonantly driving the optical scanner.

With this configuration, it is possible to drive the optical scanner with stable amplitude and frequency even if a temperature change occurs. For that reason, a circuit for reducing characteristic change due to the temperature change becomes unnecessary and miniaturization of the object recognition sensor can be achieved.

In the robot system according to the application example, it is preferable that a waveform of the drive signal is sinusoidal.

With this configuration, it is easy to generate a drive signal. It is possible to reduce inclusion of frequencies other than a drive frequency of the optical scanner in the frequency component of the drive signal and to stably perform non-resonance driving of the optical scanner.

In the robot system according to the application example, it is preferable that the automatic transport device is able to move without needing a track.

With this configuration, equipment such as a rail for guiding traveling of the automatic transport device is unnecessary or simple and thus, the equipment cost can be reduced.

In the robot system according to the application example, it is preferable that the controller creates movement route information of the automatic transport device based on the recognition result of the environment recognition sensor and controls traveling of the automatic transport device based on the movement route information.

With this configuration, even if environment recognition by the environment recognition sensor is not performed during movement of the automatic transport device, it is possible to cause the automatic transport device to travel based on traveling route information.

In the robot system according to the application example, it is preferable that the controller performs movement or orientation change of the automatic transport device based on the recognition result of the object recognition sensor.

With this configuration, position adjustment of the automatic transport device may be performed with high accuracy.

In the robot system according to the application example, it is preferable that the controller is able to drive the robot arm so that the orientation of the component in the component storage unit is changed.

With this configuration, in a case where the orientation of the component is in a state where it is difficult for the component to be taken out by the robot arm, it is possible to change the orientation of the component to a state where the component can be easily taken out.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot system according to the invention will be described in detail based on preferred embodiments illustrated in the accompanying drawings.

First Embodiment

Figure 1:
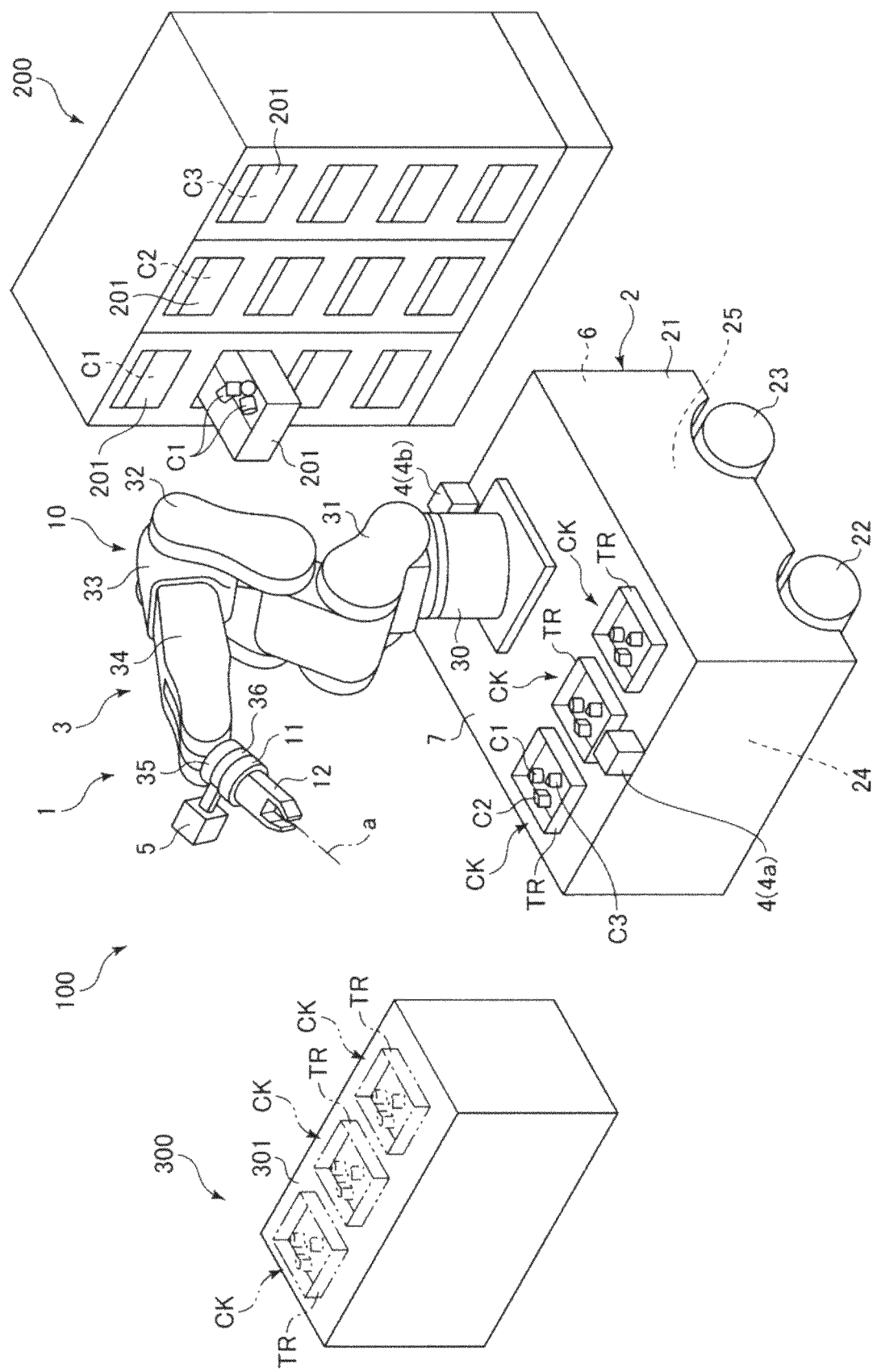
FIG. 1 is a perspective view schematically illustrating a robot system according to a first embodiment of the invention.
Figure 2:
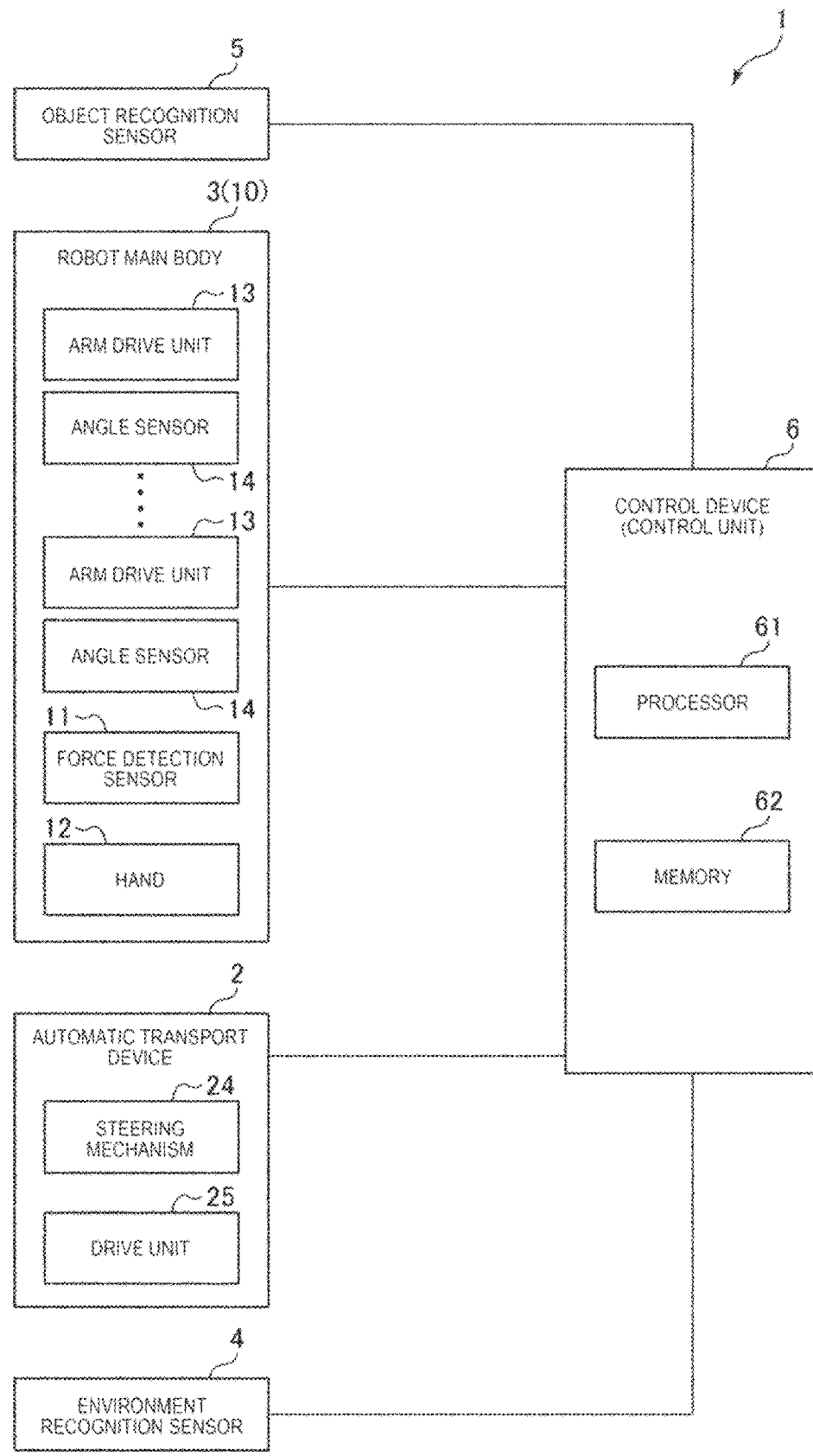
FIG. 2 is a block diagram illustrating a control system of the robot system illustrated in FIG. 1.
Figure 3:
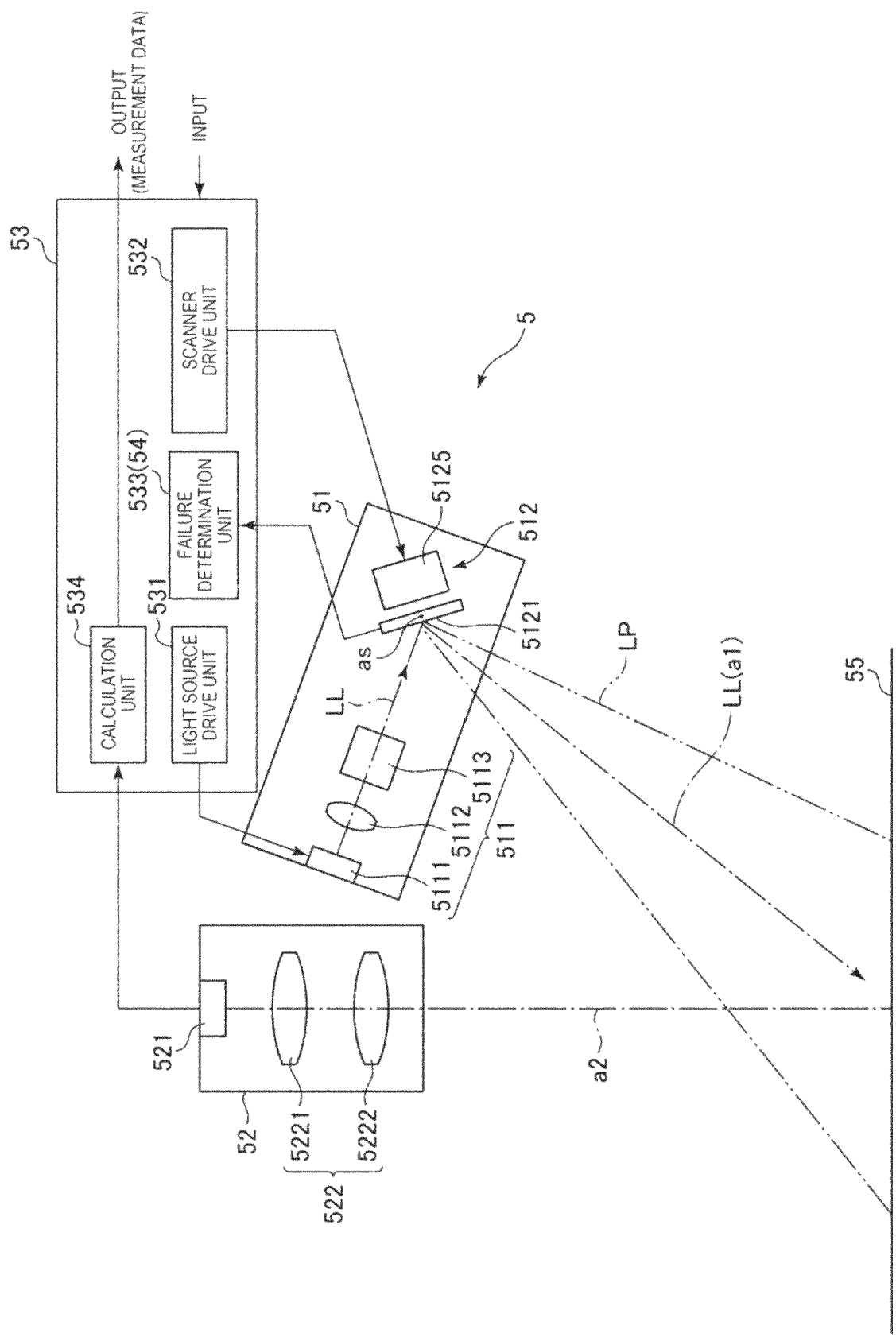
FIG. 3 is a schematic diagram of an object recognition sensor included in the robot system illustrated in FIG. 1.
Figure 4:
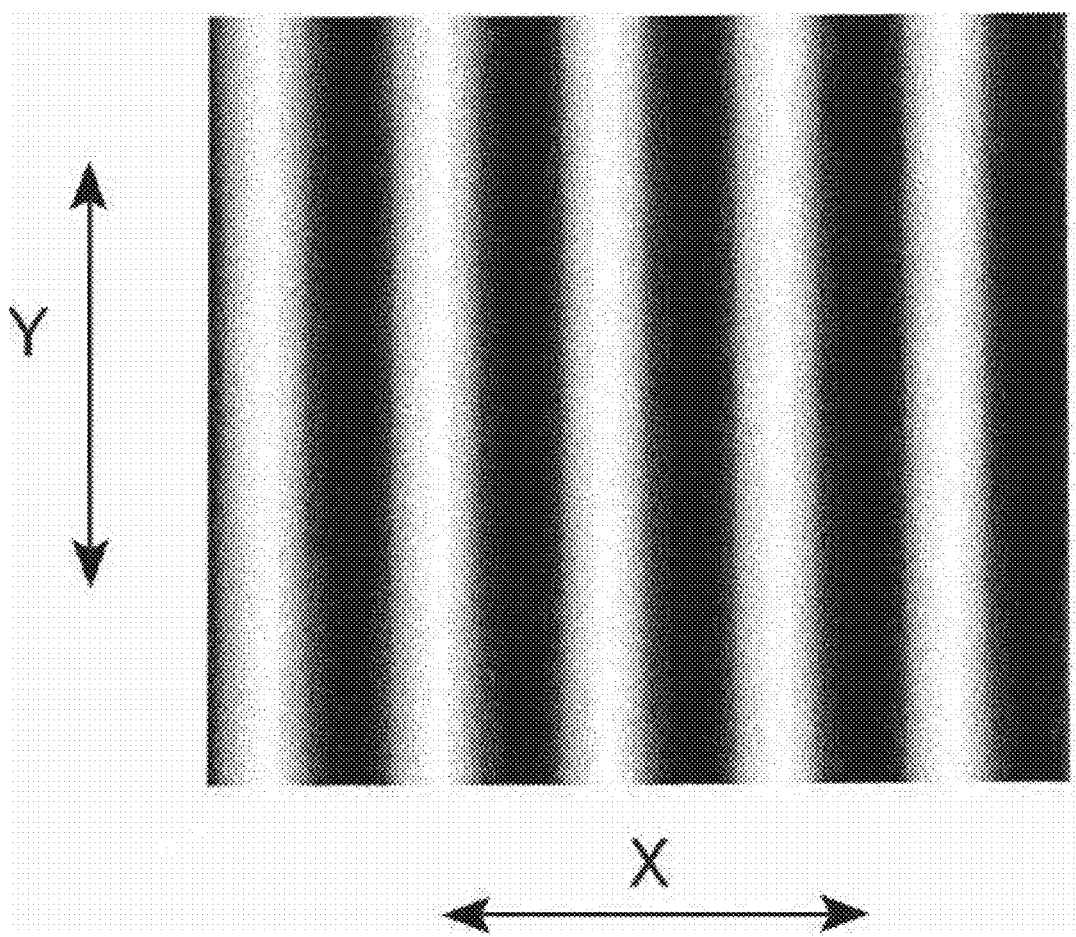
FIG. 4 is a diagram illustrating a brightness and darkness state of a projection pattern (pattern light) generated by a projection device included in the object recognition sensor illustrated in FIG. 3.
Figure 5:
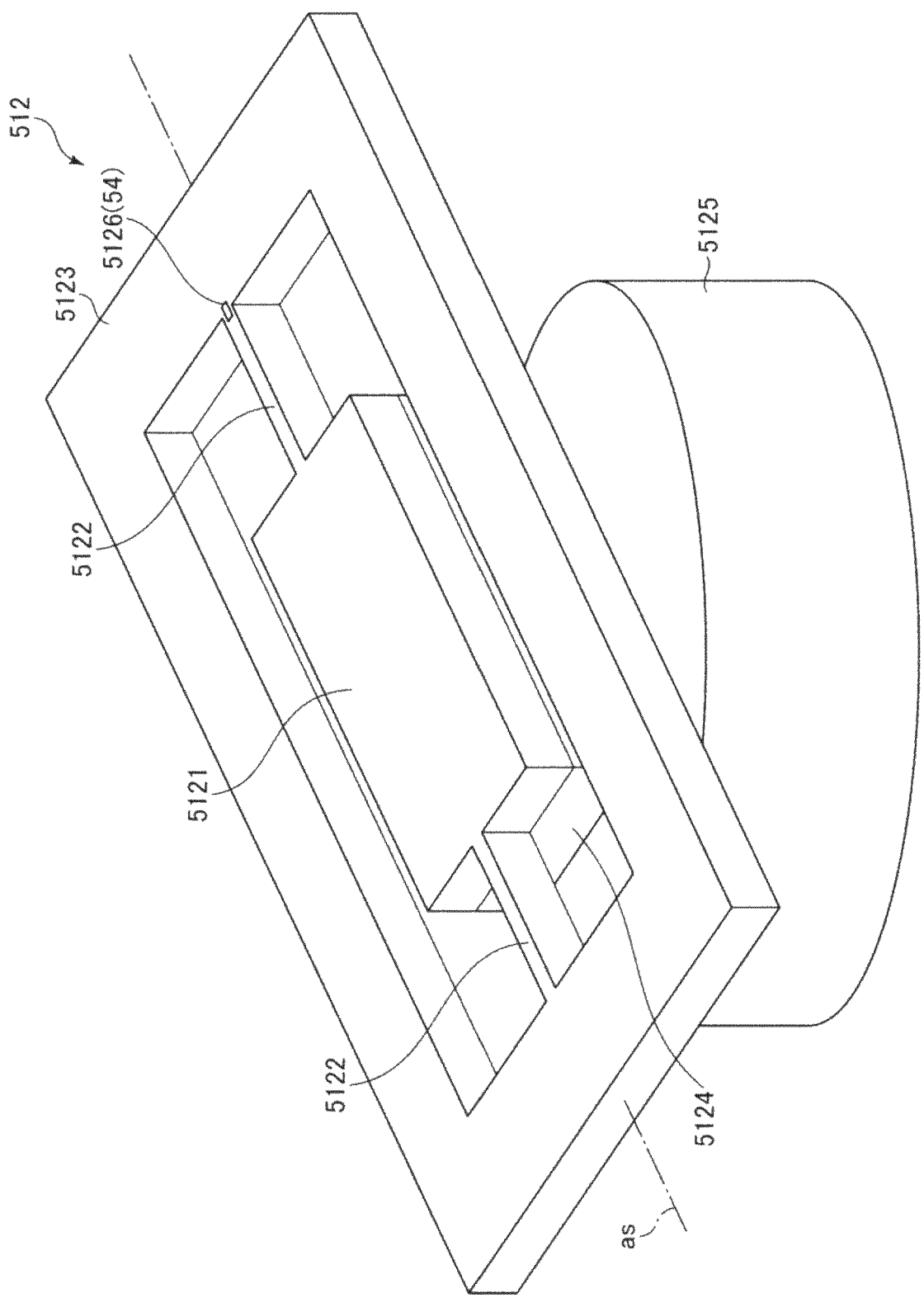
FIG. 5 is a perspective view of an optical scanner included in the object recognition sensor illustrated in FIG. 3.
Figure 6:
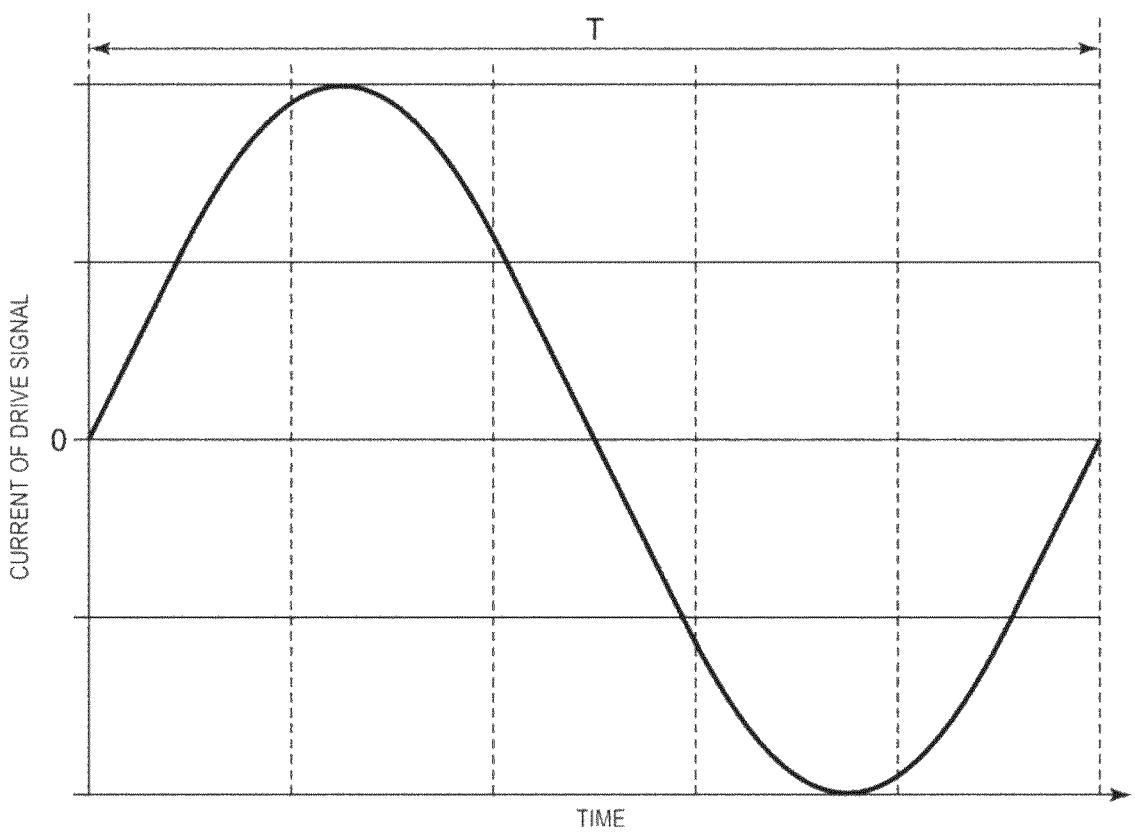
FIG. 6 is a diagram illustrating a waveform of a drive signal from a scanner drive unit included in the object recognition sensor illustrated in FIG. 3.
Figure 7:
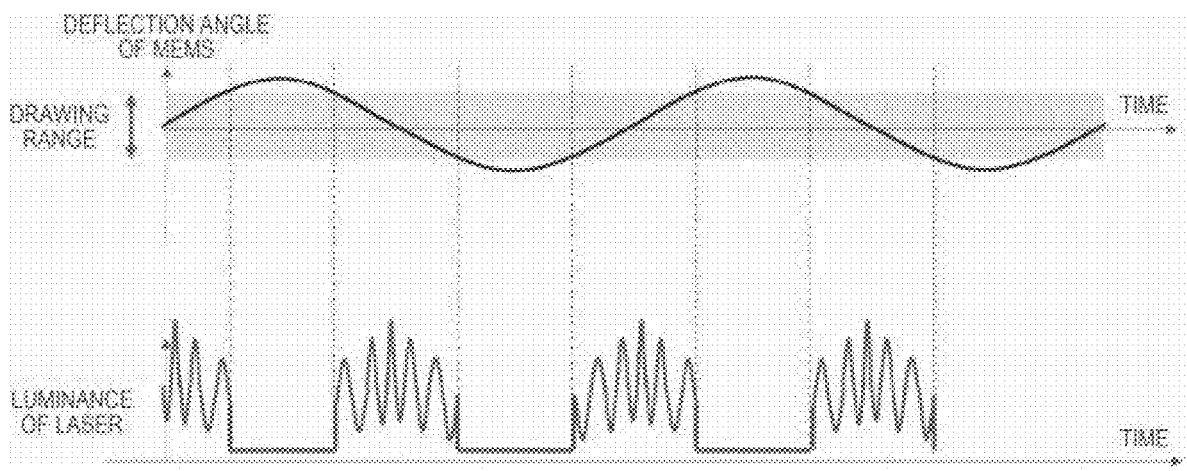
FIG. 7 is a diagram illustrating a waveform of a modulation signal (lower part in the figure) output from a light source drive unit and a deflection angle (upper part in the figure) of a movable mirror portion included in the object recognition sensor illustrated in FIG. 3.

FIG. 1 is a perspective view schematically illustrating a robot system according to a first embodiment of the invention. FIG. 2 is a block diagram illustrating a control system of the robot system illustrated in FIG. 1. FIG. 3 is a schematic diagram of an object recognition sensor included in the robot system illustrated in FIG. 1. FIG. 4 is a diagram illustrating a brightness and darkness state of a projection pattern (pattern light) generated by a projection device included in the object recognition sensor illustrated in FIG. 3. FIG. 5 is a perspective view of an optical scanner included in the object recognition sensor illustrated in FIG. 3. FIG. 6 is a diagram illustrating a waveform of a drive signal from a scanner drive unit included in the object recognition sensor illustrated in FIG. 3. FIG. 7 is a diagram illustrating a waveform of a modulation signal (lower part in the drawing) output from a light source drive unit included in the object recognition sensor illustrated in FIG. 3 and a deflection angle (upper part in the figure) of a movable mirror portion.

A robot system 100 illustrated in FIG. 1 is a system that performs work of taking out a plurality of different types of components C1, C2, and C3 from a component storage unit 200 (component supply unit), respectively, by a robot 1, creating a component kit CK composed of the plurality of types of components C1, C2, and C3, and supplying the component kit CK to the work stand 300 (next process unit).

The component storage unit 200 is a component shelf having twelve storage spaces by being divided into four rows in the vertical direction and three columns (left side, middle, right side) in the horizontal direction, and a container 201 is stored in each storage space. Here, each container 201 has a tray shape or a box shape opened upward. A plurality of components C1 are stored in each container 201 in the left side column of the component storage unit 200. A plurality of components C2 are stored in each container 201 in the middle column of the component storage unit 200. A plurality of components C3 are stored in each container 201 in the right column of the component storage unit 200. In addition, each container 201 is disposed so as to be capable of being withdrawn from the component storage unit 200. With this configuration, it is possible to easily take out the components C1, C2, and C3 from each container 201.

The component storage unit 200 is not limited to the number, configuration, arrangement, and the like of the illustrated storage spaces, and for example, the component storage unit 200 may be configured by a plurality of independent shelves for each type of component and in this case, the arrangement of the plurality of shelves is arbitrary. Further, if the components C1, C2, and C3 can be placed in a state where the robot 1 can work, the container 201 may be omitted.

The components C1, C2, and C3 are components of different types. Each of the components C1, C2, and C3 is not particularly limited, but various electronic components and the like may be included, for example. A component kit CK is configured to include the components C1, C2, and C3 one by one. The component kit CK may include components other than the components C1, C2, and C3, or may include a plurality of components of the same type.

The work stand 300 is a stand for performing work using the component kit CK. The illustrated work stand 300 includes a placement portion 301 on which the plurality of component kits CK can be placed. Work on the work stand 300 is not particularly limited, but may include, for example, assembling, painting, surface treatment, alignment, transportation, and the like of components group including the component kit CK.

Any work stand 300 may be adopted as long as a plurality of component kits CK or trays TR can be placed thereon, and a device such as a belt conveyor may be used instead of the work stand 300 without being limited to the configuration and arrangement illustrated in the figure.

The robot system 100 includes an automatic transport device 2, a robot main body 3 including a robot arm 10 and installed on the automatic transport device 2, an environment recognition sensor 4 disposed on the automatic transport device 2, an object recognition sensor 5 (shape measurement unit) disposed on the robot arm 10, a control device 6 (controller) for controlling operations of the automatic transport device 2 and the robot arm 10, and a placement portion disposed on the automatic transport device 2, and these components configure a robot 1 that can travel. The robot system 100 may also be said to be a system including the robot 1, the component storage unit 200 and the work stand 300.

Here, based on the recognition result of the environment recognition sensor 4, the control device 6 can move the automatic transport device 2 so that the robot arm 10 is in a workable position with respect to the component storage unit 200 or the work stand 300. When the robot main body 3 is at a workable position with respect to the component storage unit 200, the control device 6 can drive the robot main body 3 to create a plurality of component kits CK on the placement portion 7 based on the recognition result of the object recognition sensor 5. When the robot main body 3 is at a workable position with respect to the work stand 300, the control device 6 can drive the robot main body 3 so as to transfer the plurality of component kits CK from the placement portion 7 to the work stand 300 based on the recognition result of the object recognition sensor 5.

As such, the robot 1 can transfer the plurality of component kits CK to the work stand 300 after creating the component kits CK on the placement portion 7. With this configuration, it is possible to reduce the number of times that the automatic transport device 2 reciprocates between the component storage unit 200 and the work stand 300, thereby improving work efficiency. In the first embodiment, a plurality of trays TR are placed on the placement portion 7 before creating the component kit CK, and the component kit CK is created on the tray TR. Then, the component kit CK is transferred from the placement portion 7 to the work stand 300 for each tray TR. With this configuration, it is possible to simplify the transfer work.

In the following, each unit configuring the robot system 100 (robot 1) will be sequentially described.

Automatic Transport Device

The automatic transport device 2 illustrated in FIG. 1 is an unmanned transport vehicle that can travel (move) without needing a track. Here, the expression "capable of traveling (moving) without needing a track" means that it is possible to control travelling of the automatic transport device 2 so as to be directed toward an instructed target position without requiring equipment such as a rail serving as a traveling (moving) path of the automatic transport device 2 or a guiding line for guiding the automatic transport device 2.

As illustrated in FIGS. 1 and 2, the automatic transport device 2 includes a vehicle body 21, a pair of front wheels 22 which are attached to the vehicle body 21 and are on the forward side which is a normal travel direction side, a pair of rear wheels 23 on the rear side, a steering mechanism 24 capable of changing a steering angle of the pair of front wheels 22, and a drive unit 25 capable of driving the pair of rear wheels 23.

As illustrated in FIG. 1, the placement portion 7 on which a plurality (three in the figure) of component kits CK including a plurality of components C1, C2 and C3 can be placed is provided on the upper portion of the vehicle body 21. The placement portion 7 is configured to be able to place the component kit CK thereon in a state where the component kit CK is placed on the tray TR. Here, one component kit CK is placed on one tray TR. Accordingly, the placement portion 7 is configured to be able to place a plurality of (three in the figure) trays TR thereon. The number of trays TR that can be placed on the placement portion 7 is equal to the number of component kits CK that can be placed on the placement portion 7. Prior to creation of the component kit CK, such a tray TR is placed on the placement portion 7 by using the robot main body 3, or is manually placed on the placement portion 7.

Each of the number of the component kits CK and the number of the trays TR that can be placed on the placement portion 7 is not limited to the illustrated number, but is arbitrary. The number of trays TR that can be placed on the placement portion 7 may be different from the number of component kits CK that can be placed on the placement portion 7. For example, the plurality of component kits CK may be placed on one tray TR.

On the other hand, a pair of left and right front wheels 22 are provided on the front side and a pair of left and right rear wheels 23 are provided on the rear side, on the lower portion of the vehicle body 21.

The pair of front wheels 22 are steering wheels and are attached to the vehicle body 21 via the steering mechanism 24 illustrated in FIG. 2. Steering of the automatic transport device 2 is performed by changing the steering angle of the pair of front wheels 22 by the steering mechanism 24. With this configuration, the traveling direction of the vehicle body 21 can be changed. The pair of rear wheels 23 may be steerable, or all of one pair of front wheels 22 and one pair of rear wheels 23 may be steerable.

The pair of rear wheels 23 are driving wheels and are attached to the vehicle body 21 via the drive unit 25. The drive unit 25 includes a drive source (not illustrated) such as a motor, and transmits the driving force of the driving source to the pair of rear wheels 23. With this configuration, the vehicle body 21 can be caused to travel forward or backward. The pair of front wheels 22 may be drivable, or all of one pair of front wheels 22 and one pair of rear wheels 23 may be drivable.

A battery (not illustrated) for supplying electric power to the driving source described above is disposed in the vehicle body 21. The battery is also used for driving the robot arm 10, the environment recognition sensor 4, the object recognition sensor 5, and the like.

Robot Main Body

The robot main body 3 illustrated in FIG. 1 is a so-called single arm 6 axis vertical articulated robot. The robot main body 3 includes a base 30 and a robot arm 10 rotatably connected to the base 30. A hand 12 is attached to the robot arm 10 via a force detection sensor 11.

The base 30 is fixed to the upper portion of the vehicle body 21 of the automatic transport device by bolts or the like (not illustrated). As an installation position of the base 30 with respect to the automatic transport device 2, any position may be used as long as the robot main body 3 can place the plurality of components C1, C2, and C3 on the placement portion 7 of the automatic transport device described above. The base 30 may be formed integrally with the automatic transport device 2.

The robot arm 10 includes an arm 31 (first arm) rotatably connected to the base 30, an arm 32 (second arm) rotatably connected to the arm 31, an arm (third arm) rotatably connected to the arm 32, an arm 34 (fourth arm) rotatably connected to the arm 33, an arm 35 (fifth arm) rotatably connected to the arm 34, and an arm 36 (sixth arm) rotatably connected to the arm 35.

Arm drive units 13 illustrated in FIG. 2 are respectively provided at joint portions of the arms 31 to 36, and each of the arms 31 to 36 is rotated by driving of each of the arm drive units 13. Here, each arm drive unit 13 includes a motor and reduction gear (not illustrated). As the motor, for example, a servo motor such as an AC servo motor and a DC servo motor, a piezoelectric motor, or the like can be used. As the reduction gear, for example, a planetary gear type speed reducer, a wave-motion gear device, or the like can be used. An angle sensor 14 such as a rotary encoder (see FIG. 2) is provided in each arm drive unit 13, and the angle sensor 14 detects the rotation angle of the rotation axis of the motor or the reduction gear of the arm drive unit 13.

As illustrated in FIG. 1, the hand 12 is attached to the arm 36 positioned at the tip end portion of the robot arm 10 via a force detection sensor 11.

The force detection sensor 11 is, for example, a six-axis force sensor capable of detecting a six-axis component of the external force applied to the force detection sensor 11. Here, the six-axis component is the translational force (shearing force) component in the direction of each of three axes which are orthogonal to each other and the rotational force (moment) component around each axis of the three axes. The number of detection axes of the force detection sensor 11 is not limited to six, and may be, for example, one or more and five or less.

The hand 12 includes two fingers capable of gripping the components C1, C2 and C3, which are targets of work of the robot system 100. The number of fingers of the hand 12 is not limited to two, and may be three or more. Depending on the type of the components C1, C2, and C3, an end effector which holds the components C1, C2, and C3 by suction or the like may be used instead of the hand 12.

Environment Recognition Sensor

The environment recognition sensor 4 is provided at the front portion and the rear portion of the vehicle body 21 of the automatic transport device described above, respectively. The environment recognition sensor 4 (4a) provided at the front portion of the vehicle body 21 has a function of outputting a signal corresponding to existence (distance) of an object or the shape thereof (for example, a target such as the component storage unit 200, the work stand 300, or a wall (not illustrated), an obstacle (not illustrated) which becomes an obstacle to traveling or transporting) on the front side of the vehicle body 21. The environment recognition sensor 4 (4b) provided at the rear portion of the vehicle body 21 has a function of outputting a signal corresponding to existence (distance) of an object or the shape thereof (for example, a target such as the component storage unit 200, the work stand 300, or a wall (not illustrated), an obstacle (not illustrated) which becomes an obstacle to traveling or transporting) on the rear side of the vehicle body 21.

The installation position of the environment recognition sensor 4 and the number of installed environment recognition sensor 4 may be any as long as the environment recognition sensor 4 can recognize a range necessary for traveling and work of the robot 1, for example, the environment recognition sensor 4b may be omitted or the environment recognition sensor 4 may be provided on at least one of the right side portion and the left side portion of the vehicle body 21 in addition to the environment recognition sensors 4a and 4b, without being limited to the position and the number of the environment recognition sensor 4 described above. The environment recognition sensor 4 may be attached to a structure such as a floor, a ceiling, a pillar or the like around the automatic transport device 2.

The environment recognition sensor 4 is not particularly limited as long as it has the function described above, and it is possible to use various three-dimensional measurement machines using the time of flight (TOF) method or the like. The environment recognition sensor 4 can be configured in the same manner as the object recognition sensor 5 to be described later. However, it is preferable that the environment recognition sensor 4 has a wider measurement range (range of measurable area) than the object recognition sensor 5. With this configuration, it is possible to recognize the environment around the robot 1 over a wide range. For that reason, the robot can reduce the number of required environment recognition sensors 4 installed, reduce the dead angle of the environment recognition sensor 4, and improve safety.

In the environment recognition sensor 4, a three-dimensional orthogonal coordinate system for representing the recognition result is set, and the environment recognition sensor 4 can output coordinate information of the object in the coordinate system as a recognition result. Here, the coordinate system set in the environment recognition sensor 4 can be correlated with a robot coordinate system (coordinate system used by the control device 6 for drive control of the robot 1) set in the robot 1 in the control device 6.

Object Recognition Sensor

The object recognition sensor 5 is provided at the tip end portion of the robot arm 10 of the robot main body 3 described above. In the figure, the object recognition sensor 5 is attached to the arm 36 at the most tip end side among the arms 31 to 36 included in the robot arm 10. The object recognition sensor 5 has a function of outputting a signal corresponding to a shape of an object (for example, components C1, C2, and C3, component storage unit 200, work stand 300, placement portion 7, and the like) around or in the vicinity of the tip end portion of the robot arm 10.

The installation position of the object recognition sensor 5 is not limited to the arm 36, but may be other arms 31 to 35. The number of installed object recognition sensors 5 may be two or more.

The object recognition sensor 5 is configured to measure the shape of the object (target) around or in the vicinity of the tip end portion of the robot arm 10, for example, by using a phase shift method. That is, the target of which shape recognition is performed by the object recognition sensor 5 is a target for which the robot arm 10 works. A three-dimensional orthogonal coordinate system for representing the recognition result is set in the object recognition sensor 5, and the object recognition sensor 5 outputs coordinate information of the object in the coordinate system as a recognition result. Here, the coordinate system set in the object recognition sensor 5 is correlated with the robot coordinate system (coordinate system used by the control device 6 for drive control of the robot 1) set in the robot 1 in the control device 6.

Specifically, as illustrated in FIG. 3, the object recognition sensor 5 includes a projection device 51 that projects pattern light LP in a measurement range, an image capturing device 52 that captures the image of the measurement range, a circuit unit 53 electrically connected to each of the projection device 51 and the image capturing device 52.

The projection device 51 has a function of projecting pattern light LP, which is image light of a stripe-shaped pattern representing a sine wave with brightness and darkness of a luminance value, in the measurement range. As illustrated in FIG. 4, pattern light LP is split into n parts in a predetermined direction (preferably within a range of 5 sections to sections, and is divided into 5 sections in FIG. 4), and the luminance value changes along a sine wave in a predetermined direction (X direction illustrated in FIG. 4) with the range of each region as one cycle.

As illustrated in FIG. 3, the projection device 51 includes a light source unit 511 that emits line shaped LL and an optical scanner 512 that performing scanning light LL while reflecting light LL from the light source unit 511 to generate pattern light LP.

The light source unit 511 includes a light source 5111 and lenses 5112 and 5113. Here, the light source 5111 is, for example, a semiconductor laser. The lens 5112 is a collimating lens, and makes light transmitted through the lens 5112 a parallel light. The lens 5113 is a line generator lens (Powell lens), a cylindrical lens or a rod lens, and extends light from the light source 5111 in a line shape along a predetermined direction (Y-direction illustrated in FIG. 4) to generate light LL. The lens 5112 may be provided as necessary, and may be omitted. Instead of the lens 5113, light from the light source 5111 may be linearly extended using a concave cylindrical mirror or an optical scanner. In a case where light from the light source 5111 is in a line shape, the lens 5113 can be omitted.

The optical scanner 512 is a moving magnet type optical scanner, and reflects line-shaped light LL from the light source unit 511 and performing scanning with line-shaped light LL in a predetermined direction (X-direction illustrated in FIG. 4) to generate pattern light LP. As illustrated in FIG. 5, the optical scanner 512 includes a movable mirror portion 5121, a pair of shaft portions 5122, a support portion 5123, a permanent magnet 5124, a coil 5125, and a distortion sensor 5126.

The movable mirror portion 5121 is supported so as to be swingable around a swing axis as with respect to the support portion 5123 via the pair of shaft portions 5122 (torsion bars). The movable mirror portion 5121, the shaft portion 5122, and the support portion 5123 are integrally formed of silicon or the like, and can be obtained by etching a silicon substrate or a silicon on insulator (SOI) substrate, for example.

One surface (mirror surface) of the movable mirror portion 5121 has light reflectivity and is a portion that reflects light LL from the light source unit 511. Here, a metal film may be provided on the one surface as necessary. The movable mirror portion 5121 has a longitudinal shape along the swing axis as. With this configuration, it is possible to perform scanning with the line shaped light LL while reducing the size of the movable mirror portion 5121. A shape of the movable mirror portion 5121 in a plan view is a quadrangle (rectangle) in the figure, but is not limited thereto, and may be, for example, an elliptical shape. Also, shapes of the shaft portion 5122 and the support portion 5123 are not limited to the illustrated shapes.

The permanent magnet 5124 is bonded (fixed) to the surface of the movable mirror portion 5121 opposite to the mirror surface by an adhesive or the like. The permanent magnet 5124 is, for example, a neodymium magnet, a ferrite magnet, a samarium cobalt magnet, an alnico magnet or a bonded magnet.

A coil 5125 is disposed immediately below (side opposite to the movable mirror portion 5121) the permanent magnet 5124. This coil 5125 generates a magnetic field which interacts with the permanent magnet 5124 so as to swing the movable mirror portion 5121 around the swing axis as by energization (drive signal) from a scanner drive unit 532 (see FIG. 3) which will be described later. The disposition of the permanent magnet 5124, the coil 5125 and the like are not limited to the illustrated disposition and the like as long as the movable mirror portion 5121 can be swung around the swing axis as.

The distortion sensor 5126 is a piezo-resistance element provided at a boundary portion between the shaft portion 5122 and the support portion 5123, and a resistance value changes in accordance with strain of the shaft portions 5122. When the movable mirror portion 5121 swings (rotates) around the swing axis as, since it involves torsional deformation of the shaft portion 5122, distortion of the shaft portion 5122 caused by the torsional deformation of the shaft portion 5122 is detected by the distortion sensor 5126 and the movement of the movable mirror portion 5121 can be grasped. This distortion sensor 5126 is obtained by doping silicon configuring the boundary portion between the shaft portion 5122 and the support portion 5123 with impurities such as phosphorus or boron.

An emission direction (direction of the center axis a1) of pattern light LP of the projection device 51 as described above is inclined with respect to a direction of an optical axis a2 of the image capturing device 52. With this configuration, it is possible to measure a three-dimensional shape with high accuracy. The inclination angle is preferably in the range of 20 degrees or more and 40 degrees or less, and more preferably in the range of 25 degrees or more and 35 degrees or less. With this configuration, it is possible to measure the three-dimensional shape with high accuracy while widening the measurable range. If the inclination angle is too small, although the measurable range is widened, the measurement accuracy in the height direction is lowered, whereas if the inclination angle is too large, although the measurement accuracy in the height direction can be enhanced, the measurable range narrows.

The image capturing device 52 includes an imaging element 521 having a plurality of pixels and an image forming optical system 522, and the imaging element 521 images pattern light LP projected to the measurement range through the image forming optical system 522.

The imaging element 521 converts a captured image into electric signals for each pixel and outputs the electric signals. The imaging element 521 is not particularly limited, but may include, for example, a charge coupled device (CCD), a complementary metal oxide semiconductor (CMOS), or the like.

The image forming optical system 522 includes two lenses 5221 and 5222, and forms an image of pattern light on an object surface in the measurement range on a light receiving surface (sensor surface) of the imaging element 521. The number of lenses included in the image forming optical system 522 is not limited to the illustrated number as long as the imaging element 521 can image pattern light, and is arbitrary.

The imaging direction (optical axis a2 direction) of the image capturing device 52 is parallel to the central axis a (see FIG. 1) of the tip end portion of the robot arm 10. With this configuration, the direction in which the tip end portion of the robot arm 10 faces can be set as the measurement range.

As illustrated in FIG. 3, the circuit unit 53 includes a light source drive unit 531 for driving the light source unit 511 of the projection device 51, a scanner drive unit 532 for driving the optical scanner 512 of the projection device 51, a failure determination unit 533 for determining whether or not the optical scanner 512 is faulty, and a calculation unit 534 for calculating a shape of an object (target) within the measurement range based on a signal from the imaging element 521 of the image capturing device 52.

The scanner drive unit 532 illustrated in FIG. 3 is electrically connected to the coil 5125 of the optical scanner 512. The scanner drive unit 532 is configured to include a drive circuit for driving the coil 5125, and as illustrated in FIG. 6, the scanner drive unit 532 generates a drive signal (drive current obtained by superimposing a modulation current on a bias current) of which current value varies periodically (cycle T), and supplies the drive signal to the coil 5125. The frequency (drive frequency) of the drive signal is deviated from a resonance frequency of a vibration system including the movable mirror portion 5121 and the pair of shaft portions 5122 described above. Since the object recognition sensor 5 (circuit unit 53) does not include a circuit for controlling the frequency of the drive signal corresponding to the resonance frequency of the vibration system described above, the movable mirror portion 5121 is non-resonantly driven. That is, a circuit for reducing characteristic change due to temperature change becomes unnecessary, and it is possible to miniaturize the shape measurement unit. In a case where the movable mirror portion 5121 is non-resonantly driven, there is also an advantage that the activation time of the optical scanner 512 (time required for the movable mirror portion 5121 to reach a desired amplitude and frequency from the stopped state) can be shortened compared with a case where the movable mirror portion 5121 is resonantly driven.

Here, it is preferable that a frequency of the drive signal has a difference from the resonance frequency of the vibration system including the movable mirror portion 5121 and the pair of shaft portions 5122 so that a gain at the frequency falls within a range of 0.8 or more and 1.2 or less. Although a specific frequency of the drive signal is not particularly limited, the specific frequency is preferably within the range of 100 Hz to 4 kHz, for example. With this configuration, it is possible to easily realize non-resonant driving of the optical scanner 512 while improving measurement accuracy of the object recognition sensor 5 (shape measurement unit).

In particular, the drive signal output from the scanner drive unit 532 has a sinusoidal waveform (see FIG. 6). With this configuration, the frequency component of the drive signal becomes a single (drive frequency only), so that generation of the drive signal (forming of waveform) can be simplified. Since the drive signal does not include other frequency components other than the drive frequency, it is possible to reduce resonance driving of the movable mirror portion 5121 by the other frequency components. As a result, it is possible to stably drive the movable mirror portion 5121 non-resonantly.

The light source drive unit 531 illustrated in FIG. 3 is electrically connected to the light source 5111 of the light source unit 511. The light source drive unit 531 is configured to include a drive circuit for driving the light source 5111, generates a modulation signal (drive current obtained by superimposing a modulation current on a bias current) having a current value periodically changing, and supplies the modulation signal to the light source 5111. The modulation signal generated by the light source drive unit 531 is a signal having a waveform that is approximately sinusoidal.

However, as described above, the drive signal output by the scanner drive unit 532 is a sine wave signal (signal having a waveform of a sinusoidal waveform). For that reason, the scanning speed on a projection plane 55 (plane perpendicular to a line segment connecting the optical scanner 512 and a target of measurement projection) of light LL scanned by the optical scanner 512 varies depending on the swing angle as the movable mirror portion 5121 swings, and is not constant. Accordingly, if the modulation signal generated by the light source drive unit 531 is a sine wave signal, the projected pattern light LP does not become an intended stripe-shaped pattern. Accordingly, in order to correct this, the waveform of the modulation signal generated by the light source drive unit 531 is different from the sinusoidal waveform (waveform illustrated in the upper part of FIG. 7) as illustrated in the lower part of FIG. 7. Specifically, when the deflection angle of the movable mirror portion 5121 is θ, the drive frequency is f, the maximum amplitude (mechanical angle) is θmax, the distance between the MEMS mirror and the projection surface is h, the time is t, the luminance range is A, and the luminance offset is B, laser luminance is expressed by equation (1).

$$\text{laser luminance} = \frac{\cos(2\pi ft)}{\cos[2\theta_{max}\sin(2\pi ft)]^2} \{A\sin\{h\cdot\tan[2\theta_{max}\sin(2\pi ft)]\} + B\} \quad (1)$$

With this configuration, even if the speed of the deflection angle of the optical scanner 512 is not constant, it is possible to draw a stripe-shaped pattern light LP representing a sine wave with brightness and darkness of the luminance value as illustrated in FIG. 4.

The light source drive unit 531 is capable of outputting a drive signal of which phases are shifted by $\pi/2$. With this configuration, it is possible to generate stripe-shaped pattern light LP of which phases are shifted by $\pi/2$.

The failure determination unit 533 illustrated in FIG. 3 is electrically connected to the distortion sensor 5126 (see FIG. 5) of the optical scanner 512. Based on a resistance value of the distortion sensor 5126, the failure determination unit 533 determines whether or not the optical scanner 512 is faulty (not functioning normally). For example, the failure determination unit 533 measures the resistance value of the distortion sensor 5126, and determines that the optical scanner 512 is faulty when change (frequency) of the resistance value is not synchronized with the frequency of the drive signal. Here, the distortion sensor 5126 and the failure determination unit 533 configure a failure detection unit 54 for detecting a failure of the optical scanner 512.

Although it is not illustrated, the calculation unit 534 illustrated in FIG. 3 includes a processor such as a central processing unit (CPU) and a memory such as a read only memory (ROM) and a random access memory (RAM). The calculation unit 534 calculates the shape of the object based on the image capturing result of the image capturing device 52 by executing a measurement program stored in the memory by the processor.

The object recognition sensor 5 as described above projects pattern light LP from the projection device 51 toward the measurement range and images projected pattern light LP by the image capturing device 52. In this case, for example, the light source drive unit 531 outputs four drive signals shifted in phase by $\pi/2$, and pattern light LP projected with the phase shifted by $\pi/2$ is projected four times, and the image capturing device 52 images the projected pattern light LP each time. In the luminance values at the same coordinates of the four captured images obtained by imaging conducted four times, even if an absolute value varies depending on a surface condition, color, or the like of a measurement target at that coordinate, a relative value changes by the phase difference of pattern light LP. With this configuration, it is possible to obtain a phase value of the stripe-shaped pattern at that coordinates while reducing the influence of ambient light and the surface condition of the measurement object and the like.

Here, the phase value is first obtained in the range of $-\pi$ to $+\pi$ for each stripe-shape of the stripe-shaped pattern, not a continuous value in the captured image. Then, such phase values are phase-linked (phase-connected) so as to be consecutive values in the captured image. With this configuration, the shape of the measurement target can be measured based on the phase value.

As described above, the object recognition sensor 5 described above includes the projection device 51 that projects stripe-shaped pattern light LP to the target, the image capturing device 52 that images pattern light LP, and the calculation unit 534 that calculates the shape of the object based on the imaging result of the image capturing device 52. The projection device 51 includes the light source unit 511 that emits light LL that is a line-shaped laser and the optical scanner 512 that reflects light LL from the light source unit 511 toward the target to scan the target. With this configuration, a small object recognition sensor 5 can be realized.

The projection device 51 includes the scanner drive unit 532 that outputs a drive signal for non-resonantly driving the optical scanner 512. With this configuration, even when temperature change occurs, the optical scanner 512 can be driven with stable amplitude and frequency. For that reason, a circuit for reducing characteristic change due to the temperature change is unnecessary, and the object recognition sensor 5 can be miniaturized.

The waveform of the drive signal output by the scanner drive unit 532 is sinusoidal (see FIG. 6). With this configuration, it is easy to generate the drive signal. It is possible to reduce inclusion of frequencies other than the drive frequency of the optical scanner 512 in the frequency component of the drive signal and to stably perform non-resonance driving of the optical scanner 512.

Control Device

The control device 6 (controller) illustrated in FIG. 2 has a function of controlling driving of the automatic transport device 2 and the robot arm 10 based on recognition results of the environment recognition sensor 4 and the object recognition sensor 5.

The control device 6 (controller) includes a processor 61 such as a central processing unit (CPU) and a memory 62 (storage unit) such as a read only memory (ROM) and a random access memory (RAM). The control device 6 is disposed in the vehicle body 21 of the automatic transport device 2, but is not limited thereto, and for example, may be disposed in the base 30 of the robot main body 3, outside the vehicle body 21, or the like.

In the memory 62, a program for performing drive control of the automatic transport device 2 and the robot arm 10, component shape information of the components C1, C2, and C3 as targets of work and map information of the environment in which the robot system 100 is used (environment around the robot 1) are stored. Here, the map information includes position information and shape information of an object (component storage unit 200, work stand 300, and the like) in the environment in which the robot 1 is used.

The processor 61 appropriately reads and executes the programs and various information stored in the memory 62, thereby performing drive control of the automatic transport device 2 and the robot arm 10.

In such a control device 6, a robot coordinate system is set as a coordinate system used by the control device 6 for drive control of the automatic transport device 2 and the robot arm 10. This robot coordinate system is correlated with the coordinate system which is set at the tip end portion (for example, tool center point) of the robot arm 10. With this configuration, the control device 6 can set the tip end portion of the robot arm 10 or the hand to a desired position and orientation. As described above, the robot coordinate system is also correlated with the coordinate system set in the environment recognition sensor 4 and the object recognition sensor 5, and the automatic transport device 2 and the robot arm 10 can be operated as desired, based on the recognition results of the environment recognition sensor 4 and the object recognition sensor 5.

In the following, drive control of the automatic transport device 2 and the robot arm 10 by the control device 6 will be described.

Figure 8:
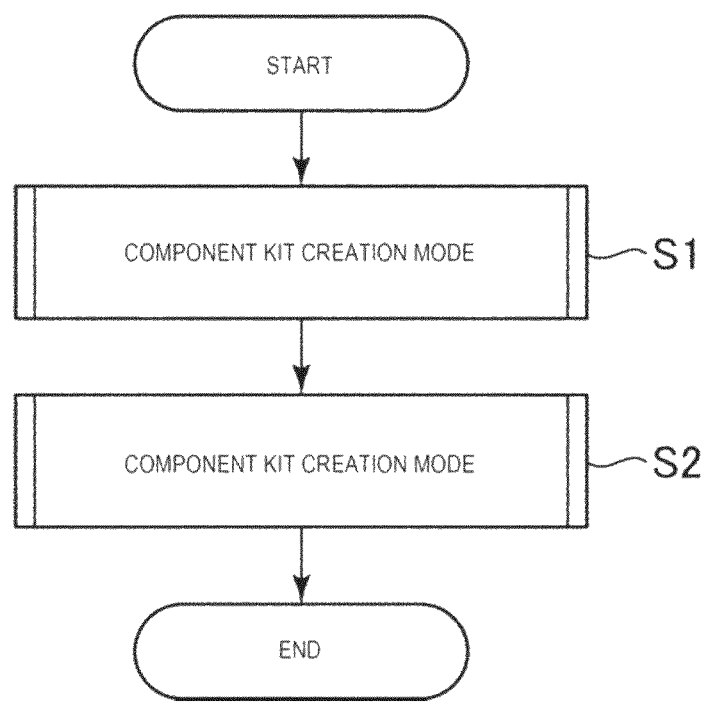
FIG. 8 is a flowchart for explaining an operation of the robot system illustrated in FIG. 1.
Figure 9:
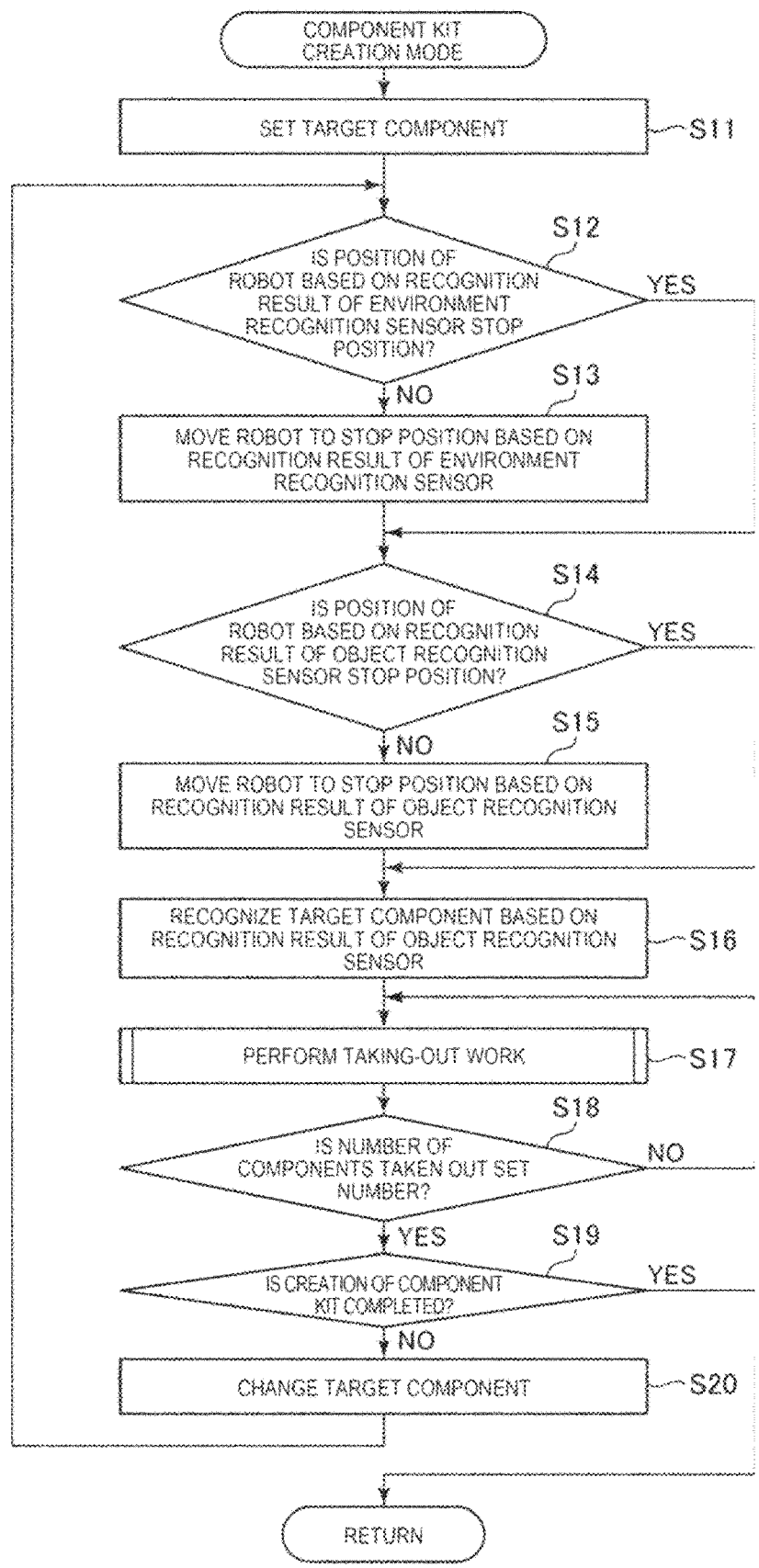
FIG. 9 is a flowchart for explaining an operation in a component kit creation mode illustrated in FIG. 8.
Figure 10:
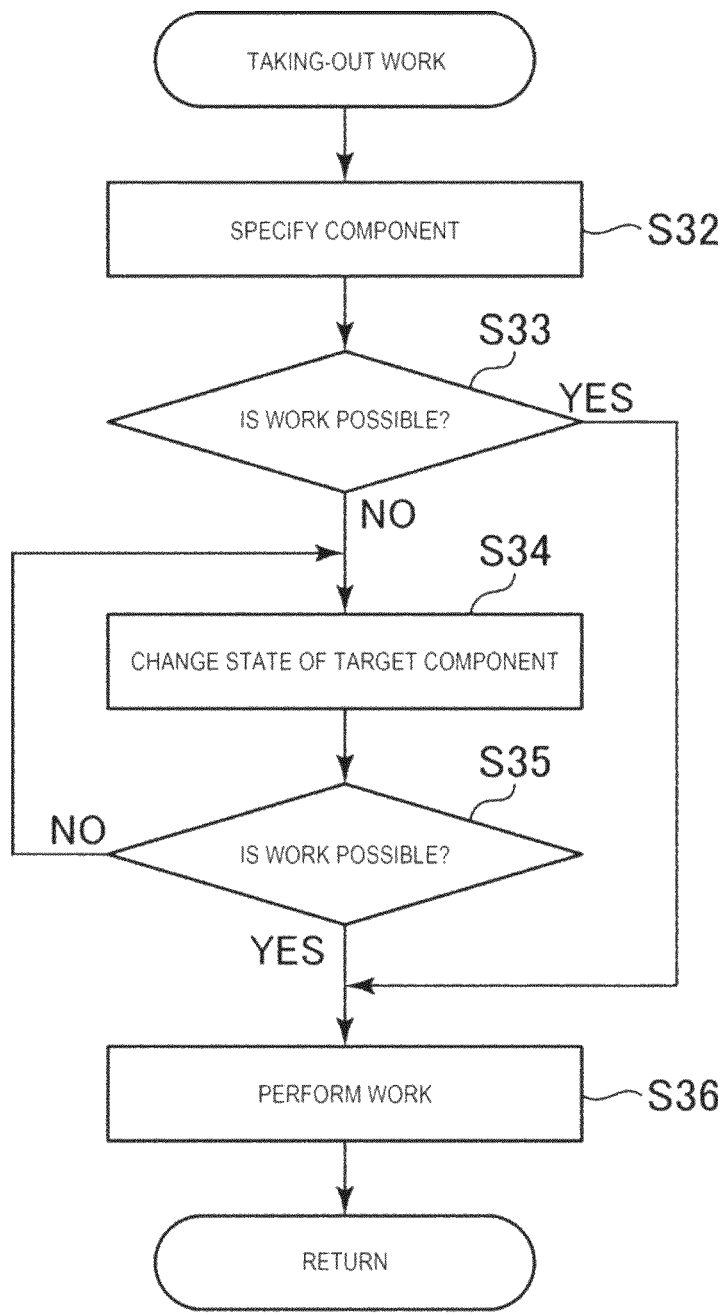
FIG. 10 is a flowchart for explaining an operation of taking-out work illustrated in FIG. 9.
Figure 11:
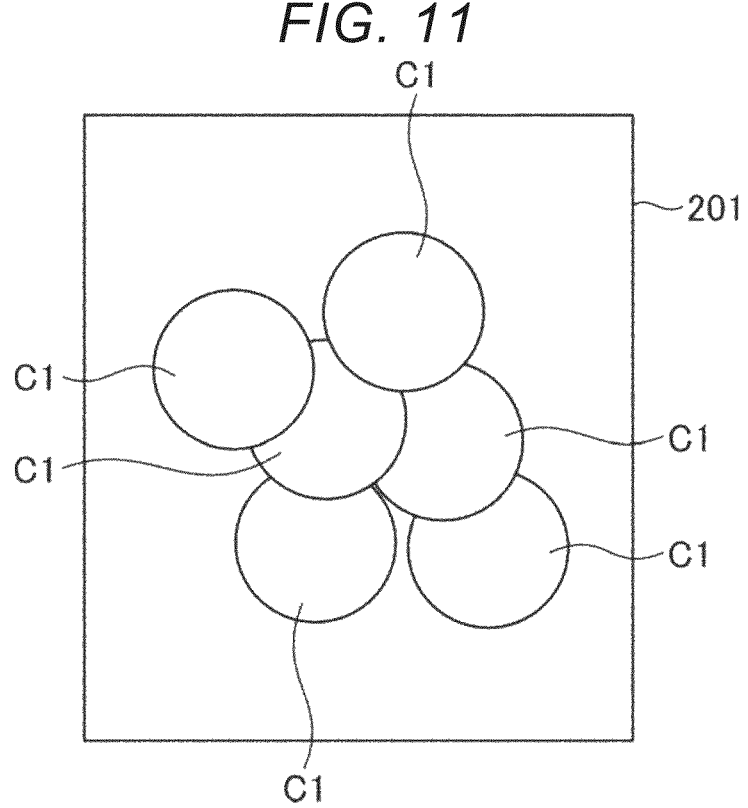
FIG. 11 is a diagram for explaining a case where components are in an unworkable state.
Figure 12:
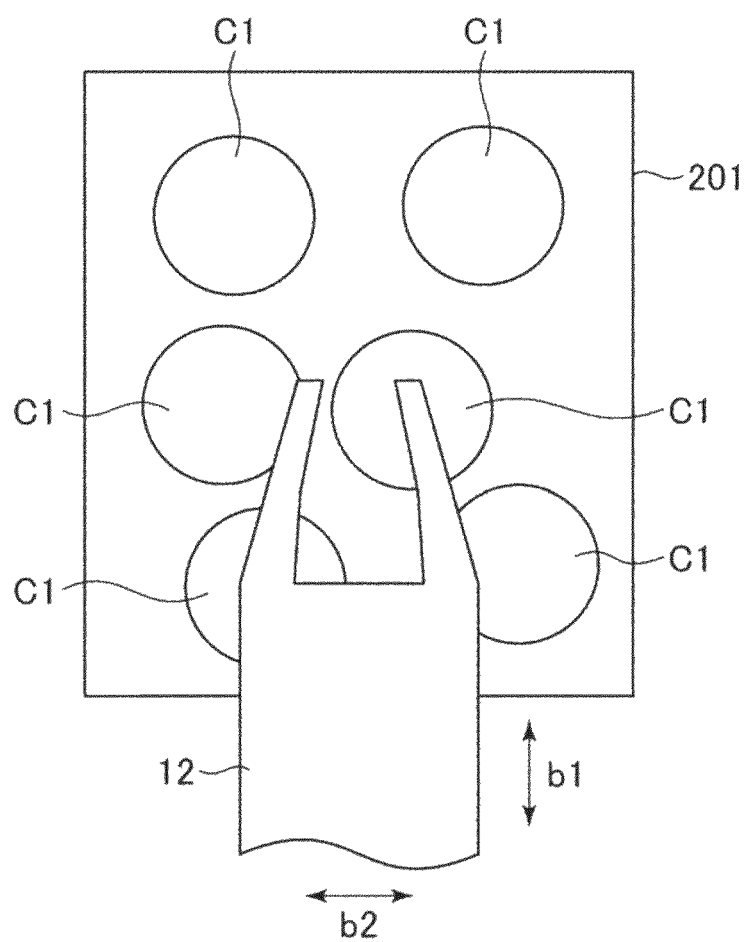
FIG. 12 is a diagram for explaining step S34 illustrated in FIG. 10.
Figure 13:
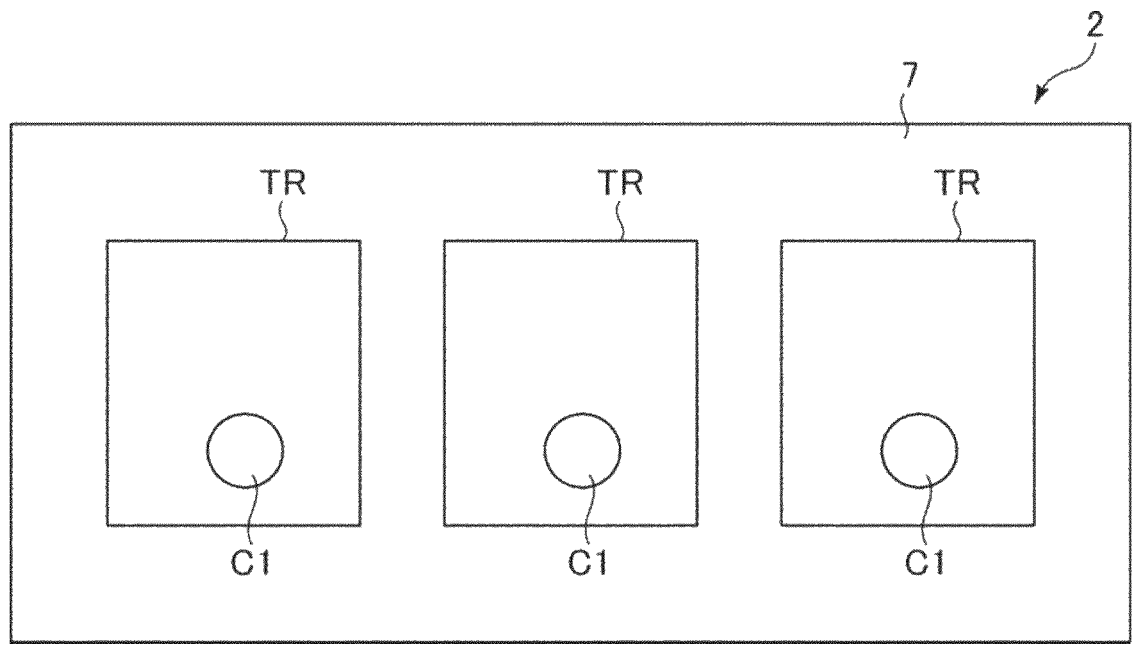
FIG. 13 is a diagram for explaining taking-out work of one type of component.
Figure 14:
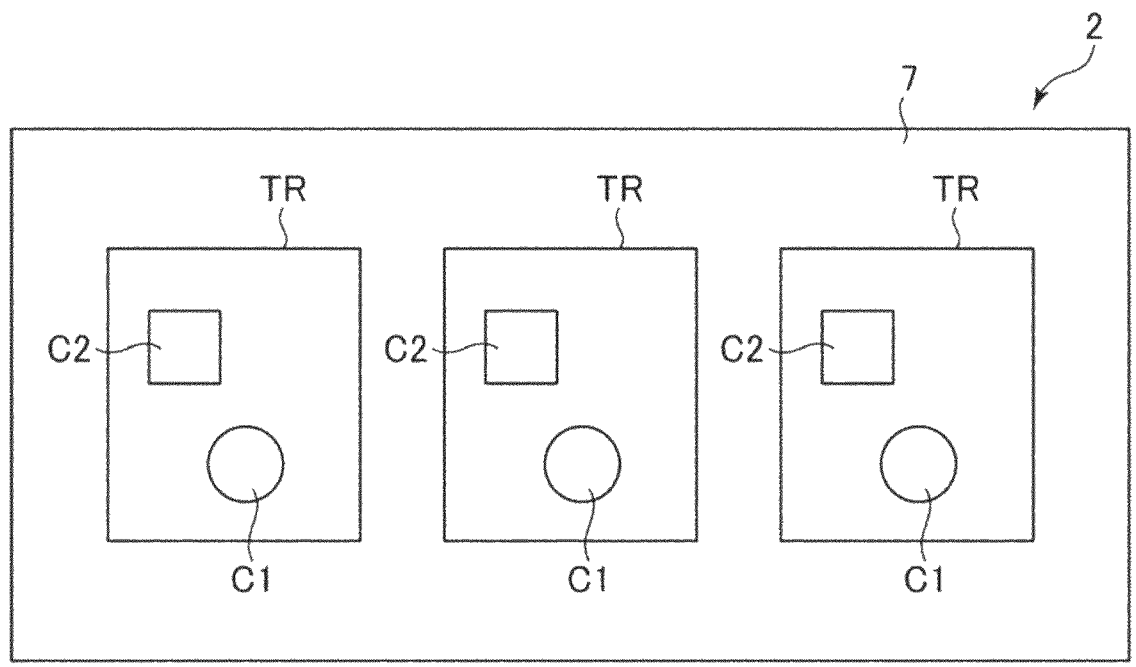
FIG. 14 is a diagram for explaining taking-out work of two types of components.
Figure 15:
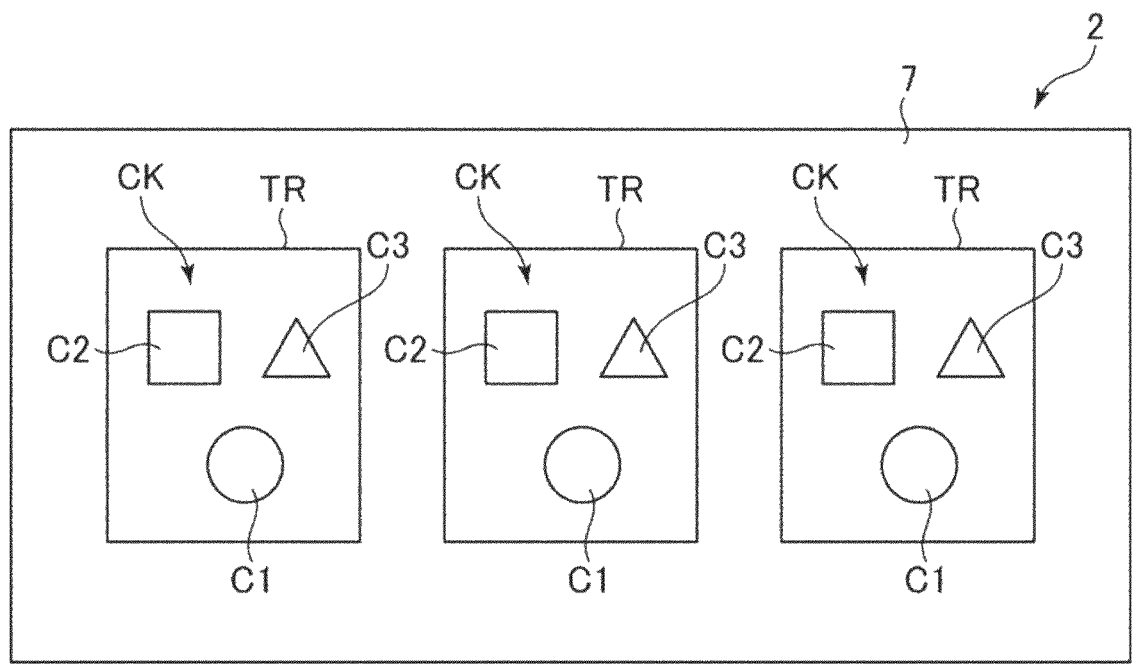
FIG. 15 is a diagram for explaining taking-out work of three types of components.
Figure 16:
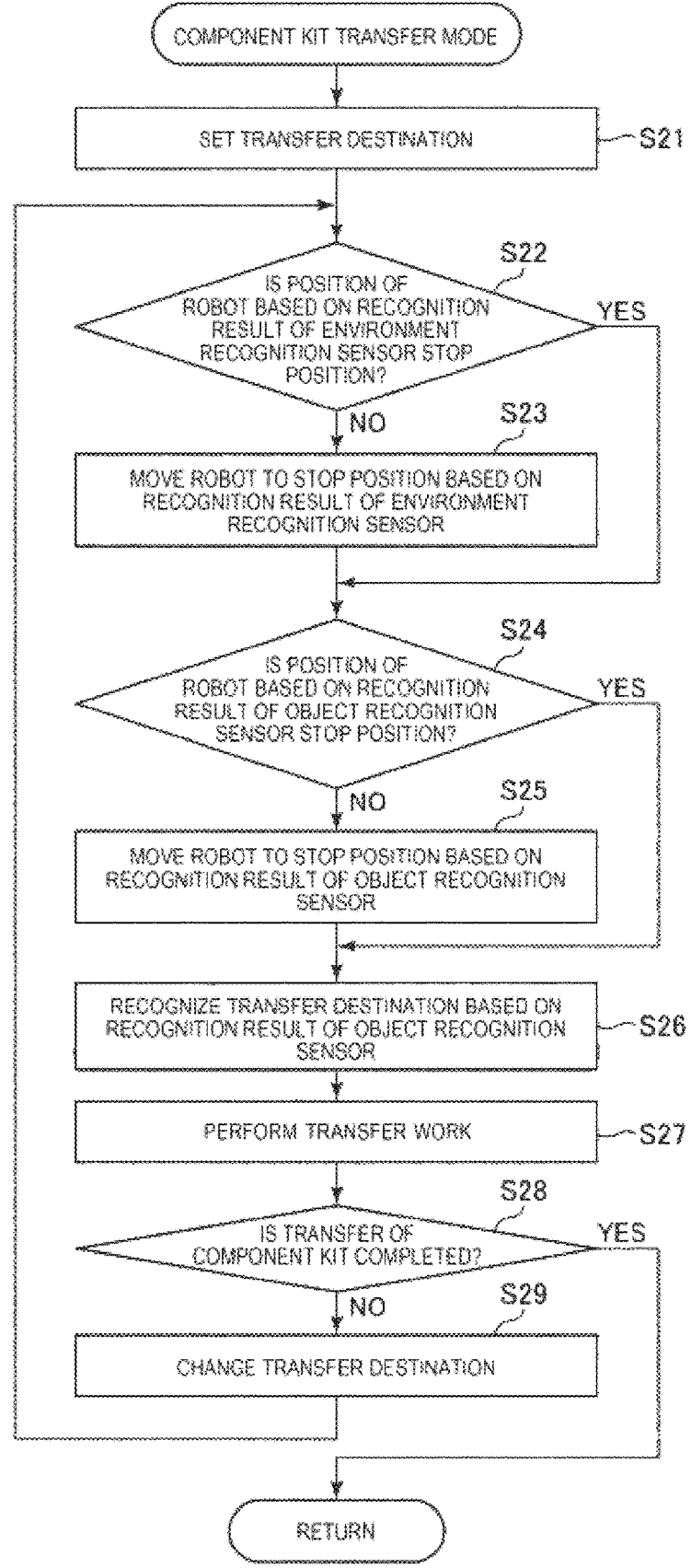
FIG. 16 is a flowchart for explaining an operation in a component kit transfer mode illustrated in FIG. 8.
Figure 17:
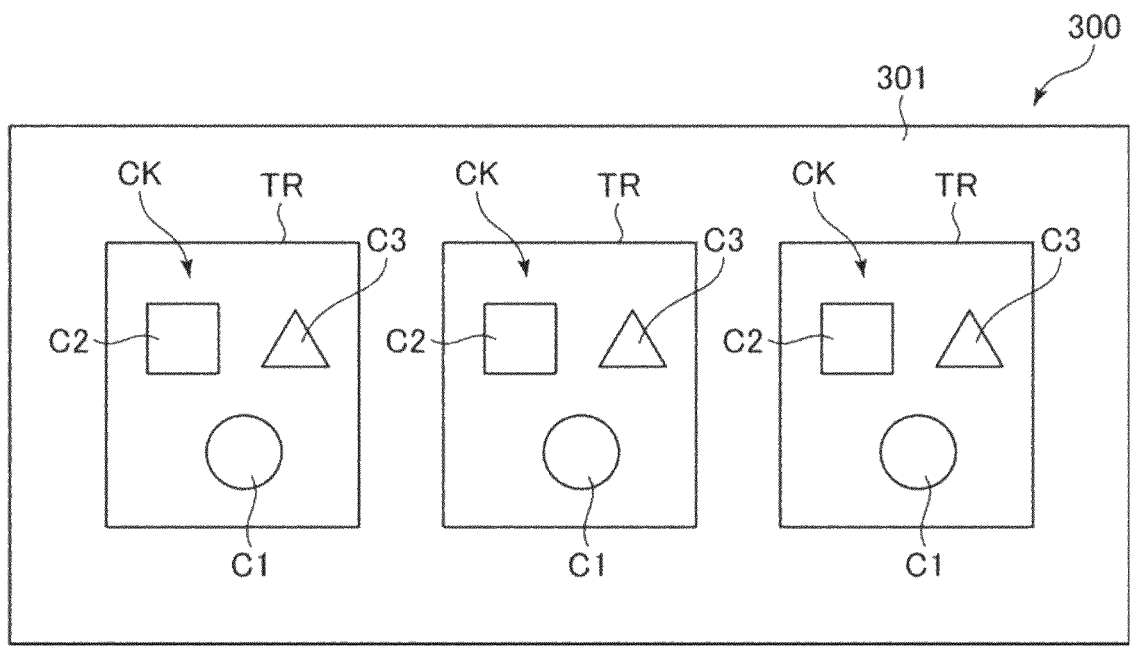
FIG. 17 is a diagram illustrating a state of a work stand at the time of transfer completion.

FIG. 8 is a flowchart for explaining an operation of the robot system illustrated in FIG. 1. FIG. 9 is a flowchart for explaining an operation in a component kit creation mode illustrated in FIG. 8. FIG. 10 is a flowchart for explaining an operation of taking-out work illustrated in FIG. 9. FIG. 11 is a diagram for explaining a case where components are in an unworkable state. FIG. 12 is a diagram for explaining step S34 illustrated in FIG. 10. FIG. 13 is a diagram for explaining taking-out work of one type of component. FIG. 14 is a diagram for explaining taking-out work of two types of components. FIG. 15 is a diagram for explaining taking-out work of three types of components. FIG. 16 is a flowchart for explaining an operation in a component kit transfer mode illustrated in FIG. 8. FIG. 17 is a diagram illustrating a state of a work stand at the time of transfer completion.

As illustrated in FIG. 8, the control device 6 has a component kit creation mode (step S1) and a component kit transfer mode (step S2), and sequentially executes these modes. Here, the component kit creation mode is a mode in which the components C1, C2, and C3 are taken out from the component storage unit 200 and a plurality of component kits CK are created on the placement portion 7. The component kit transfer mode is a mode in which the plurality of component kits CK are transferred from the placement portion 7 to the work stand 300. Each mode will be described in detail below.

Component Kit Creation Mode

In the component kit creation mode, as illustrated in FIG. 9, a target component is first set (step S11). This target component is any one of the components C1, C2, and C3, for example, the component C1 is set as the target component.

Next, it is determined whether or not the position of the robot 1 (more specifically, automatic transport device 2) based on the recognition result of the environment recognition sensor 4 is a stop position (step S12). In this case, the current position of the automatic transport device 2 is ascertained by collating map information (especially, position information of the component storage unit 200) stored in the memory 62 with the recognition result of the environment recognition sensor 4. Then, the current position is compared with the position of the component storage unit 200 in the map information, and it is determined whether or not the current position is the stop position. This stop position is a position (work position) at which the robot arm 10 can work on the target component or a position at which the object recognition sensor 5 can recognize a target position (position at which the target component exists) of the component storage unit 200.

In a case where the current position of the automatic transport device 2 based on the recognition result of the environment recognition sensor 4 is not the stop position (NO in step S12), the automatic transport device 2 is moved to the stop position based on the recognition result of the environment recognition sensor 4 (step S13). In this case, a traveling route to the stop position of the automatic transport device 2 may be determined by using the result of comparison in step S12 described above and driving of the automatic transport device 2 may be controlled based on a traveling route, and driving of the automatic transport device 2 may be controlled so that the current position of the automatic transport device 2 coincides with the stop position, while collating the map information stored in the memory 62 with the recognition result of the environment recognition sensor 4. After such step S13, processing proceeds to step S14 to be described later. It is preferable that driving of the robot arm 10 is stopped while the automatic transport device 2 is being driven (moving) (the same is also true during movement of automatic transport device 2 in other steps). With this configuration, for example, it is possible to reduce damage of the object recognition sensor 5 attached to the robot arm 10 due to impact or the like.

Here, it is preferable that the control device 6 (controller) creates traveling route information (movement route information) of the automatic transport device 2 based on the recognition result of the environment recognition sensor 4 and controls traveling of the automatic transport device 2 based on the traveling route information. With this configuration, even if the environment recognition sensor 4 does not recognize the environment during the movement of the automatic transport device 2, it is possible to cause the automatic transport device 2 to travel based on the traveling route information.

On the other hand, in a case where the current position of the automatic transport device 2 based on the recognition result of the environment recognition sensor 4 is the stop position (YES in step S12), it is determined whether or not the position of the robot (more specifically, automatic transport device 2) based on the recognition result of the object recognition sensor 5 is the stop position (step S14). In this case, the current position of the automatic transport device 2 is ascertained by collating map information (particularly, shape information of the component storage unit 200) stored in the memory 62 with the recognition result of the object recognition sensor 5. Then, the current position is compared with a work position (for example, position of the container 201 to be subjected to work) of the component storage unit 200 in the map information, and it is determined whether or not the current position is the stop position. This stop position is a position where the robot arm 10 can work on the target component.

In a case where the current position of the automatic transport device 2 based on the recognition result of the object recognition sensor 5 is not the stop position (NO in step S14), the automatic transport device 2 is moved to the stop position based on the recognition result of the object recognition sensor 5 (step S15). With this configuration, fine adjustment of the position of the automatic transport device 2 can be performed. In this case, the traveling route to the stop position of the automatic transport device 2 may be determined by using the result of comparison in step S14 described above and driving of the automatic transport device 2 may be controlled based on the traveling route, and driving of the automatic transport device 2 may be controlled so that the current position of the automatic transport device 2 coincides with the stop position, while collating the map information stored in the memory 62 with the recognition result of the object recognition sensor 5. After such step S15, processing proceeds to step S16 to be described later.

As such, the control device 6 (controller) moves the automatic transport device 2 or changes the orientation of the automatic transport device 2 based on the recognition result of the object recognition sensor 5 as necessary. With this configuration, the position adjustment of the automatic transport device 2 can be performed with high accuracy.

On the other hand, in a case where the current position of the automatic transport device 2 based on the recognition result of the object recognition sensor 5 is the stop position (YES in step S14), the target component is recognized based on the recognition result of the object recognition sensor 5 (step S16). In this case, the target container 201 is taken out using the hand 12. Then, the position and orientation of the target component in the container 201 are ascertained by collating the shape information (shape information of the target component among the components C1, C2, and C3) stored in the memory 62 with the recognition result of the object recognition sensor 5.

Next, taking-out work of the target component is performed (step S17). In this case, as illustrated in FIG. 10, first, one component to be taken out is specified among the plurality of target components in the container 201 (step S32). Then, it is determined whether or not work is possible (step S33). In this case, as illustrated in FIG. 11, in a case where all of the plurality of target components (components C1 in the figure) overlap each other, it is determined that work is impossible.

In a case where it is determined that work is impossible (NO in step S33), a state of the target component is changed (step S34). In this case, as illustrated in FIG. 12, by using the hand 12, the states of a plurality of target components are changed so that the plurality of target components do not overlap each other. Here, for example, the hand 12 is moved to at least one of the central axis direction b1 and the width direction b2 to perform work such as pecking, rolling, and leveling on at least one target component. This step S34 is repeated until it is determined that work is possible (NO in step S35).

As such, the control device 6 (controller) can drive the robot arm 10 so that the orientation of the components C1, C2 or C3 in the component storage unit 200 is changed. With this configuration, when the orientation of the components C1, C2 or C3 is in a state difficult to take out by the robot arm 10, it is possible to change the orientation of the component C1, C2 or C3 to a state where it is easy to take out.

In a case where it is determined that the work can be performed (YES in steps S33 and S35), work to take out the target component is performed (step S36). In this case, the position and orientation are ascertained by collating the shape information (shape information of the target component out of the components C1, C2, and C3) stored in the memory 62 with the recognition result of the object recognition sensor 5. Then, based on the position and orientation, the robot arm 10 and the hand 12 are operated to grip the target component with the hand 12 to be placed on the placement portion 7. It is preferable that driving of the automatic transport device 2 is stopped during driving (during work) of the robot arm 10 (the same applies to transfer work to be described later). With this configuration, working accuracy can be improved.

Such taking-out work is repeated until the number of components taken out reaches the set number (three in the case of the first embodiment) (NO in step S18). By repeating taking-out work in this way, as illustrated in FIG. 13, the target component (component C1 in the figure) is placed on each tray TR on the placement portion 7. Then, in a case where the number of components taken out reaches the set number, it is determined whether or not creation of the component kit CK is completed (step S19). In this case, when the component placed on each tray TR is one (see FIG. 13) or two (see FIG. 14) of the components C1, C2, and C3, it is determined that the creation of the component kit CK is not completed (NO in step S19), and the target component is changed (step S20). In this case, for example, in the case illustrated in FIG. 13, the target component is changed to the component C2, and in the case illustrated in FIG. 14, the target component is changed to C3. Then, processing proceeds to step S12 described above.

As illustrated in FIG. 15, when all of the components C1, C2, and C3 are placed on each tray TR, it is determined that creation of the component kit CK is completed (YES in step S19), the component kit creation mode (step S1 illustrated in FIG. 8) is ended, and processing proceeds to the component kit transfer mode (step S2 illustrated in FIG. 8).

Component Kit Transfer Mode

In the component kit transfer mode, as illustrated in FIG. 16, first, a transfer destination is set (step S21). This transfer destination is the work stand 300.

Next, it is determined whether or not the position of the robot 1 (more specifically, automatic transport device 2) based on the recognition result of the environment recognition sensor 4 is a stop position (step S22). In this case, by collating the map information (particularly, position information of the work stand 300) stored in the memory 62 with the recognition result of the environment recognition sensor 4, the current position of the automatic transport device 2 is ascertained. Then, the current position is compared with the position of the work stand 300 in the map information, and it is determined whether or not the current position is the stop position. This stop position is a position (work position) where the robot arm 10 can place the component kit CK on the placement portion 301 or a position where the object recognition sensor 5 can recognize the placement portion 301 of the work stand 300.

In a case where the current position of the automatic transport device 2 based on the recognition result of the environment recognition sensor 4 is not the stop position (NO in step S22), the automatic transport device 2 is moved to the stop position based on the recognition result of the environment recognition sensor 4 (step S23). In this case, the traveling route to the stop position of the automatic transport device 2 may be determined by using the result of comparison in step S22 described above and driving of the automatic transport device 2 may be controlled based on the traveling route, and driving of the automatic transport device 2 may be controlled so that the current position of the automatic transport device 2 coincides with the stop position, while collating the map information stored in the memory 62 with the recognition result of the environment recognition sensor 4. After such step S23, processing proceeds to step S24 to be described later.

On the other hand, in a case where the current position of the automatic transport device 2 based on the recognition result of the environment recognition sensor 4 is the stop position (YES in step S22), it is determined whether or not the position of the robot (more specifically, automatic transport device 2) based on the recognition result of the object recognition sensor 5 is the stop position (step S24). In this case, the current position of the automatic transport device 2 is ascertained by collating the map information (particularly, shape information of the work stand 300) stored in the memory 62 with the recognition result of the object recognition sensor 5. Then, the current position is compared with the work position (for example, position of the placement portion 301) of the work stand 300 in the map information, and it is determined whether or not the current position is the stop position. This stop position is a position where the robot arm 10 can place the component kit CK on the placement portion 301.

In a case where the current position of the automatic transport device 2 based on the recognition result of the object recognition sensor 5 is not the stop position (NO in step S24), the automatic transport device 2 is moved to the stop position based on the recognition result of the object recognition sensor 5 (step S25). With this configuration, fine adjustment of the position of the automatic transport device 2 can be performed. In this case, the traveling route to the stop position of the automatic transport device 2 may be determined by using the result of comparison in step S24 described above and driving of the automatic transport device 2 may be controlled based on the traveling route, and driving of the automatic transport device 2 may be controlled so that the current position of the automatic transport device 2 coincides with the stop position, while collating the map information stored in the memory 62 with the recognition result of the object recognition sensor 5. After such step S25, processing proceeds to step S26 to be described later.

On the other hand, in a case where the current position of the automatic transport device 2 based on the recognition result of the object recognition sensor 5 is the stop position (YES in step S24), the placement portion 301 which is the transfer destination is recognized, based on the recognition result of the object recognition sensor 5 (step S26). In this case, the position and the orientation of the placement portion 301 are ascertained by collating information (shape information of the work stand 300) stored in the memory 62 with the recognition result of the object recognition sensor 5.

Next, the transfer work of the component kit CK is performed (step S27). In this case, the tray TR is gripped by the hand 12, and the component kit CK is transferred from the placement portion 7 to the placement portion 301 for each tray TR. Then, it is determined whether or not transfer of the component kit CK is completed (step S28). In a case where it is determined that the transfer of the component kit CK is not completed (NO in step S28), the transfer destination is changed as necessary (step S29). Then, processing proceeds to step S22 described above. With this configuration, as illustrated in FIG. 17, all the component kits CK can be transferred on the placement portion 301.

In a case where it is determined that the transfer of the component kit CK is completed (YES in step S28), the component kit transfer mode (step S2 illustrated in FIG. 8) is ended.

The robot system 100 as described above includes the automatic transport device 2 that can be automatically moved, the single robot arm 10 that is installed on the automatic transport device 2 and performs work on a target, the object recognition sensor 5 that is disposed on the robot arm and recognizes the target, the environment recognition sensor 4 that recognizes an environment in a direction in which the automatic transport device 2 moves. In particular, the robot system 100 includes the placement portion 7 which is disposed on the automatic transport device 2 and on which a plurality of component kits CK including a plurality of types of components C1, C2, and C3 different from each other can be placed, and the control device 6 that is a controller that controls driving of the automatic transport device 2 and the robot arm 10 based on the recognition result of the environment recognition sensor 4 and the object recognition sensor 5. Then, the control device 6 controls driving of the automatic transport device 2 so as to move toward the work stand 300 disposed at a position different from the component storage unit 200 based on the recognition result of the environment recognition sensor 4 and controls driving of the robot arm 10 so as to transfer the plurality of component kits CK from the placement portion 7 to the work stand 300 based on the recognition result of the object recognition sensor 5 after controlling driving of the robot arm 10 so as to take out the plurality of components C1, C2, and C3 from the component storage unit 200 that stores the plurality of components C1, C2, and C3 based on the recognition result of the object recognition sensor 5 and creates the plurality of the component kits CK on the placement portion 7.

According to such a robot system 100, since the automatic transport device 2 is moved toward the work stand 300 and the plurality of component kits CK are directly transferred from the placement portion 7 to the work stand 300 after the plurality of components C1, C2, and C3 are respectively taken out from the component storage unit 200 and the plurality of component kits CK are created on the placement portion 7, it is possible to reduce the number of times that the automatic transport device 2 reciprocates between the component storage unit 200 and the work stand 300 as compared with a case where the plurality of components C1, C2, and C3 are respectively taken out from the component storage unit 200 and the plurality of component kits CK are created on the work stand 300. For that reason, it is possible to efficiently create a component kit.

Here, the automatic transport device 2 is able to move without needing a track. With this configuration, equipment such as a rail for guiding traveling route of the automatic transport device is unnecessary or simple and thus, the equipment cost can be reduced. In the case where the traveling route necessary for work is constant, the automatic transport device 2 may travel along a rail or the like.

Second Embodiment

Figure 18:
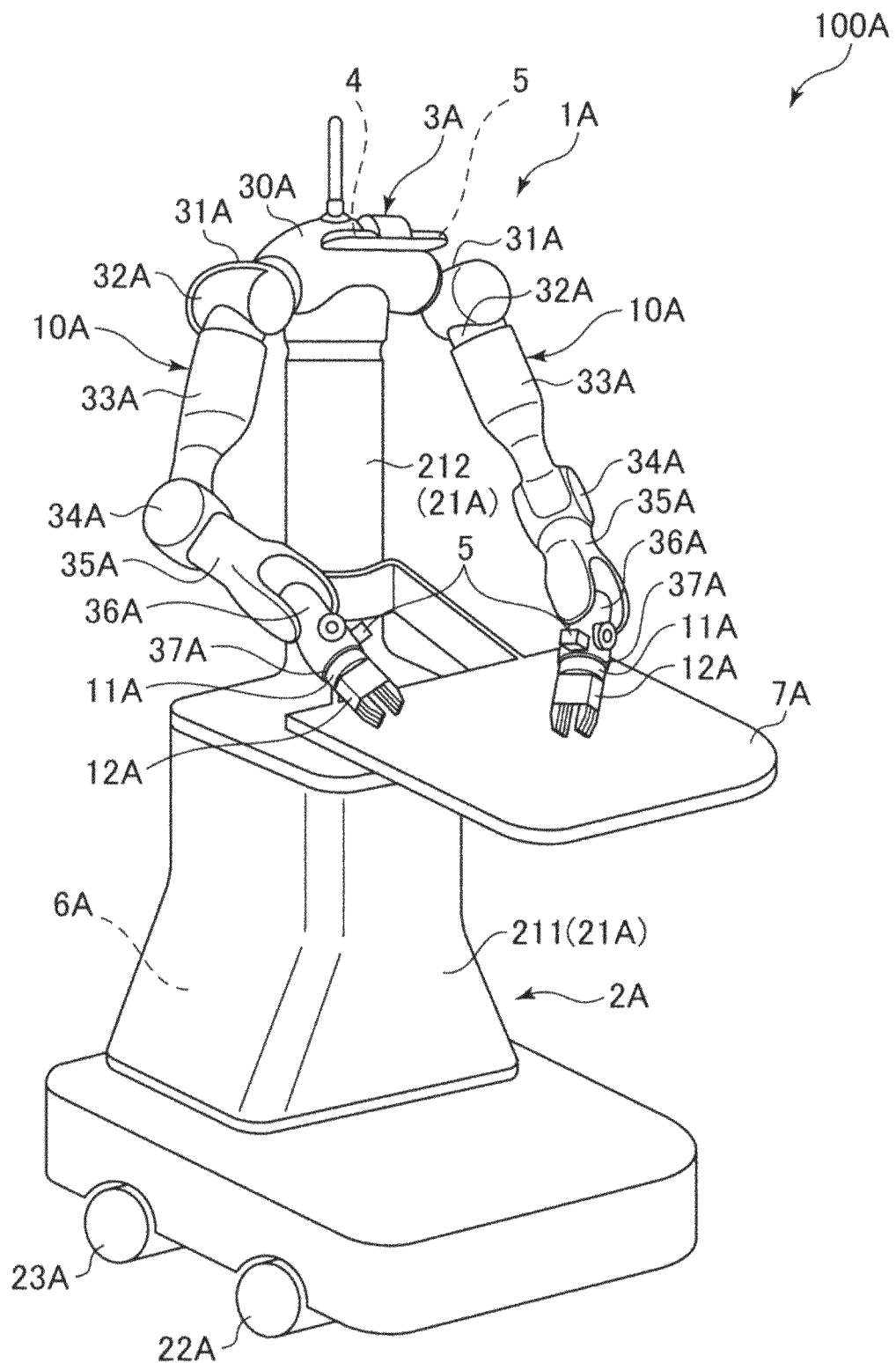
FIG. 18 is a perspective view illustrating a robot used in a robot system according to a second embodiment of the invention.

FIG. 18 is a perspective view illustrating a robot used in a robot system according to a second embodiment of the invention.

The second embodiment is the same as the first embodiment described above except that the invention is applied to a dual arm robot. In the following, the second embodiment will be described mainly on differences from the first embodiment described above, and description of similar matters will be omitted.

A robot system 100A includes an automatic transport device 2A, a robot main body 3A which is installed on the automatic transport device 2A and includes two robot arms 10A, the environment recognition sensor 4 disposed on the automatic transport device 2A, the object recognition sensors 5 (shape measurement unit) respectively disposed on the automatic transport device 2A and each robot arm 10A, a control device 6A (controller) that controls the operation of the automatic transport device 2A and each robot arm 10A, and a placement portion 7A disposed on the automatic transport device 2A, and these components configure a robot 1A that can travel.

The automatic transport device 2A includes a vehicle body 211, a pair of front wheels 22A and a pair of rear wheels 23A attached to the vehicle body 211, a pillar portion 212 erected on the vehicle body 211, a steering mechanism (not illustrated) capable of changing the steering angle of the pair of front wheels 21A, and a drive unit (not illustrated) capable of driving the pair of rear wheels 23A. Here, the placement portion 7A on which the plurality of component kits CK of the first embodiment described above can be placed is attached to the pillar portion 212.

The robot main body 3A is a multi-arm robot, and includes a base 30A (body portion) connected to the upper portion of the pillar portion 212 of the automatic transport device 2A and two robot arms 10A rotatably connected to the right and left of the base 30A. A hand 12A is connected to each robot arm 10A via a force detection sensor 11A. Here, on the base 30A, the environment recognition sensor 4 and the object recognition sensor 5 are disposed. The base 30A is fixedly installed to the automatic transport device 2A and can be said to be a portion of the automatic transport device 2A.

Each robot arm 10A includes an arm 31A (first arm), an arm 32A (second arm), an arm 33A (third arm), an arm 34A (fourth arm), an arm 35A (fifth arm), an arm 36A (sixth arm), and an arm 37A (seventh arm). These arms 31A to 37A are connected in this order from the base end side to the tip end side. Between the arms 31A to 37A, two adjacent arms are rotatable with each other. Here, the object recognition sensor 5 is disposed on the arm 37A of each robot arm 10A.

The control device 6A (controller) has a function of controlling driving of the automatic transport device 2A and the robot arm 10A based on the recognition results of the environment recognition sensor 4 and the object recognition sensor 5.

More specifically, the control device 6A is able to move the automatic transport device 2A so that each robot arm 10A is positioned at a workable position with respect to the component storage unit 200 or the work stand 300 of the first embodiment described above, based on the recognition result of the environment recognition sensor 4. When the robot main body 3A (robot arm 10A) is positioned at the workable position with respect to the component storage unit 200, the control device 6A can drive the robot main body 3A so as to create the plurality of component kits CK on the placement portion 7A, based on the recognition result of the object recognition sensor 5. When the robot main body 3A is positioned at the workable position with respect to the work stand 300, the control device 6A can drive the robot main body 3A so as to transfer the plurality of component kits CK from the placement portion 7A to the work stand 300, based on the recognition result of the object recognition sensor 5. The object recognition sensor 5 may not be disposed in all of the base 30A and each robot arm 10A, but may be disposed in any one or two of the base 30A and each robot arm 10A.

Also, according to the second embodiment as described above, the same effects as those of the first embodiment described above can be achieved. In the robot system 100A of the second embodiment, the number of the robot arms 10A is two. With this configuration, work efficiency can be improved and more complicated work can be performed. Further, it is possible not only to create the component kit CK on the placement portion 7A, but also to perform work such as assembling the component kit CK on the placement portion 7A.

Although the robot system according to the invention has been described based on the illustrated embodiments, the invention is not limited thereto, and the configuration of each unit can be replaced with any configuration having the same function. Also, any other constituent element may be added to the invention.

The invention may be a combination of any two or more configurations (characteristics) of the embodiments described above.

In the embodiments described above, a case where the component kit CK including three types of components C1, C2, and C3 is created is described as an example, but the number and types of components configuring the component kit CK are not limited thereto, for example, the number of components included in the component kit CK may be two or four or more, and the component kit CK may include a plurality of components of the same kind.

Also, the number of arms (number of joints) included in the robot arm is not limited to the number (6 or 7) of the embodiments described above, and may be 1 or more to 5 or less, or 8 or more.

The object recognition sensor suffices if the robot arm can obtain a recognition result that is workable on the object and is not limited to the configurations of the embodiments described above. For example, the object recognition sensor may be a sensor using a method other than a phase shift method (for example, TOF method), or a sensor having a configuration in which the projection device projects pattern light using a liquid crystal panel.

Further, in the embodiments described above, the case where the optical scanner used for the object recognition sensor is a moving magnet type optical scanner is described as an example, but a driving method of the optical scanner is not limited thereto, and may be a moving coil method, an electrostatic driving method, a piezoelectric drive system or the like.

The entire disclosure of Japanese Patent Application No. 2017-187414, filed Sep. 28, 2017 is expressly incorporated by reference herein.

What is claimed is:

1. A robot system comprising:
    a moving automatic transport device;
    a robot arm that is installed on the automatic transport device and transports target components;
    an object recognition sensor that is disposed on the robot arm and recognizes the target components;
    an environment recognition sensor that recognizes an environment in a direction in which the automatic transport device moves;
    a placement portion that is disposed on the automatic transport device; and
    a controller,
    wherein the controller is configured to:
        cause the robot arm to create a plurality of component kits on the placement portion by controlling the robot arm to take out a plurality of components from a component storage unit that stores the plurality of components based on the target components recognized by the object recognition sensor;
        after creating the plurality of component kits, cause the automatic transport device to move toward a work stand based on the environment recognized by the environment recognition sensor; and
        after moving the automatic transport device toward the work stand, cause the robot arm to transfer the plurality of component kits from the placement portion to the work stand; and
    wherein the object recognition sensor includes:
        a projection device that projects stripe-shaped pattern light to the target;
        an image capturing device that captures the image of the pattern light on the target; and
        a processor that calculates a shape of the target based on an image capturing result of the image capturing device, and
    the projection device includes:
        a light source that emits a line-shaped laser; and
        an optical scanner that reflects the laser from the light source toward the target to scan the target.

2. The robot system according to claim 1,
    wherein the projection device includes a scanner driver that outputs a drive signal for non-resonantly driving the optical scanner.

3. The robot system according to claim 2,
    wherein a waveform of the drive signal is sinusoidal.

4. The robot system according to claim 3,
    wherein the automatic transport device moves without needing a track.

5. The robot system according to claim 4,
    wherein the controller creates movement route information of the automatic transport device based on the recognition result of the environment recognition sensor and controls traveling of the automatic transport device based on the movement route information.

6. The robot system according to claim 1,
    wherein the controller performs movement or orientation change of the automatic transport device based on the recognition result of the object recognition sensor.

7. The robot system according to claim 1,
    wherein the controller drives the robot arm so that the orientation of the component in the component storage unit is changed.

* * * * *